(12) United States Patent
Geissler

(10) Patent No.: US 11,047,175 B2
(45) Date of Patent: Jun. 29, 2021

(54) COMBINED MULTI-COUPLER WITH ROTATING LOCKING METHOD FOR TOP DRIVE

(71) Applicant: Weatherford Technology Holdings, LLC, Houston, TX (US)

(72) Inventor: David Geissler, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 512 days.

(21) Appl. No.: 15/721,216

(22) Filed: Sep. 29, 2017

(65) Prior Publication Data

US 2019/0100970 A1   Apr. 4, 2019

(51) Int. Cl.
*F16L 37/252* (2006.01)
*E21B 17/03* (2006.01)
*E21B 17/046* (2006.01)
*E21B 19/16* (2006.01)

(52) U.S. Cl.
CPC ............ *E21B 17/03* (2013.01); *E21B 17/046* (2013.01); *E21B 19/16* (2013.01)

(58) Field of Classification Search
CPC ....... F16L 37/08; F16L 37/107; F16L 37/113; F16L 37/138; F16L 37/24; F16L 37/244; F16L 37/252; E21B 17/043; E21B 17/046
USPC ....... 285/81–86, 91, 92, 330, 402, 362, 317, 285/314, 913, 914
See application file for complete search history.

(56) References Cited

U.S. PATENT DOCUMENTS

| | | | |
|---|---|---|---|
| 989,251 A * | 4/1911 | Hall | F16L 37/252 285/88 |
| 1,039,536 A * | 9/1912 | Hill | F16L 37/252 285/86 |
| 1,367,156 A | 2/1921 | McAlvay et al. | |
| 1,610,977 A | 12/1926 | Scott | |
| 1,822,444 A | 9/1931 | MacClatchie | |
| 1,853,299 A | 4/1932 | Carroll | |
| 2,370,354 A | 2/1945 | Hurst | |
| 3,147,992 A | 9/1964 | Haeber et al. | |
| 3,354,951 A | 11/1967 | Savage et al. | |
| 3,385,370 A | 5/1968 | Knox et al. | |
| 3,662,842 A | 5/1972 | Bromell | |
| 3,698,426 A | 10/1972 | Litchfield et al. | |
| 3,747,675 A | 7/1973 | Brown | |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

EPO Office Action dated May 8, 2020, for European Application No. 18773043.7.

(Continued)

*Primary Examiner* — Aaron M Dunwoody
(74) *Attorney, Agent, or Firm* — Patterson + Sheridan, LLP

(57) ABSTRACT

A tool coupler includes a first component having a tubular body and a locking member and a second component. The second component includes a housing having an opening for receiving the tubular body; a locking ring having a latch; and an axial channel; a recess for receiving the locking member, wherein the latch is positioned in the channel to retain the locking member in the recess.

22 Claims, 24 Drawing Sheets

(56) References Cited

U.S. PATENT DOCUMENTS

| | | |
|---|---|---|
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,873,062 A * | 3/1975 | Johnson ............... F16L 37/133 251/149.6 |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui |
| 5,188,399 A * | 2/1993 | Durina ................. F16L 37/252 285/148.26 |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,244,632 B1 * | 6/2001 | Gasparini ............. F16L 37/084 285/401 |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,044,507 B2 * | 5/2006 | Ricard ................. F16L 37/113 285/330 |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |

(56) References Cited

U.S. PATENT DOCUMENTS

| | | | |
|---|---|---|---|
| 7,451,826 B2 | 11/2008 | Pietras | |
| 7,490,677 B2 | 2/2009 | Buytaert et al. | |
| 7,503,397 B2 | 3/2009 | Giroux et al. | |
| 7,509,722 B2 | 3/2009 | Shahin et al. | |
| 7,513,300 B2 | 4/2009 | Pietras et al. | |
| 7,530,607 B2 * | 5/2009 | Luft | F16B 7/0406 285/402 |
| 7,591,304 B2 | 9/2009 | Juhasz et al. | |
| 7,617,866 B2 | 11/2009 | Pietras | |
| 7,635,026 B2 | 12/2009 | Mosing et al. | |
| 7,665,515 B2 | 2/2010 | Mullins | |
| 7,665,530 B2 | 2/2010 | Wells et al. | |
| 7,665,531 B2 | 2/2010 | Pietras | |
| 7,669,662 B2 | 3/2010 | Pietras | |
| 7,690,422 B2 | 4/2010 | Swietlik et al. | |
| 7,694,730 B2 | 4/2010 | Angman | |
| 7,694,744 B2 | 4/2010 | Shahin | |
| 7,699,121 B2 | 4/2010 | Juhasz et al. | |
| 7,712,523 B2 | 5/2010 | Snider et al. | |
| 7,730,698 B1 | 6/2010 | Montano et al. | |
| 7,757,759 B2 | 7/2010 | Jahn et al. | |
| 7,779,922 B1 | 8/2010 | Harris et al. | |
| 7,793,719 B2 | 9/2010 | Snider et al. | |
| 7,817,062 B1 | 10/2010 | Li et al. | |
| 7,828,085 B2 | 11/2010 | Kuttel et al. | |
| 7,841,415 B2 | 11/2010 | Winter | |
| 7,854,265 B2 | 12/2010 | Zimmermann | |
| 7,866,390 B2 | 1/2011 | Latiolais, Jr. et al. | |
| 7,874,352 B2 | 1/2011 | Odell, II et al. | |
| 7,874,361 B2 | 1/2011 | Mosing et al. | |
| 7,878,237 B2 | 2/2011 | Angman | |
| 7,878,254 B2 | 2/2011 | Abdollahi et al. | |
| 7,882,902 B2 | 2/2011 | Boutwell, Jr. | |
| 7,896,084 B2 | 3/2011 | Haugen | |
| 7,918,273 B2 | 4/2011 | Snider et al. | |
| 7,958,787 B2 | 6/2011 | Hunter | |
| 7,971,637 B2 | 7/2011 | Duhon et al. | |
| 7,975,768 B2 | 7/2011 | Fraser et al. | |
| 8,118,106 B2 | 2/2012 | Wiens et al. | |
| 8,141,642 B2 | 3/2012 | Distad et al. | |
| 8,210,268 B2 | 7/2012 | Heidecke et al. | |
| 8,281,856 B2 | 10/2012 | Jahn et al. | |
| 8,307,903 B2 | 11/2012 | Redlinger et al. | |
| 8,365,834 B2 | 2/2013 | Liess et al. | |
| 8,459,361 B2 | 6/2013 | Leuchtenberg | |
| 8,505,984 B2 | 8/2013 | Henderson et al. | |
| 8,567,512 B2 | 10/2013 | Odell, II et al. | |
| 8,601,910 B2 | 12/2013 | Begnaud | |
| 8,636,067 B2 | 1/2014 | Robichaux et al. | |
| 8,651,175 B2 | 2/2014 | Fallen | |
| 8,668,003 B2 | 3/2014 | Osmundsen et al. | |
| 8,708,055 B2 | 4/2014 | Liess et al. | |
| 8,727,021 B2 | 5/2014 | Heidecke et al. | |
| 8,776,898 B2 | 7/2014 | Liess et al. | |
| 8,783,339 B2 | 7/2014 | Sinclair et al. | |
| 8,839,884 B2 | 9/2014 | Kuttel et al. | |
| 8,893,772 B2 | 11/2014 | Henderson et al. | |
| 9,068,406 B2 | 6/2015 | Clasen et al. | |
| 9,206,851 B2 | 12/2015 | Slaughter, Jr. et al. | |
| 9,528,326 B2 | 12/2016 | Heidecke et al. | |
| 9,631,438 B2 | 4/2017 | McKay | |
| 2002/0043403 A1 | 4/2002 | Juhasz et al. | |
| 2002/0074132 A1 | 6/2002 | Juhasz et al. | |
| 2002/0084069 A1 | 7/2002 | Mosing et al. | |
| 2002/0129934 A1 | 9/2002 | Mullins et al. | |
| 2002/0170720 A1 | 11/2002 | Haugen | |
| 2003/0098150 A1 | 5/2003 | Andreychuk | |
| 2003/0107260 A1 | 6/2003 | Ording et al. | |
| 2003/0221519 A1 | 12/2003 | Haugen | |
| 2004/0003490 A1 | 1/2004 | Shahin et al. | |
| 2004/0069497 A1 | 4/2004 | Jones et al. | |
| 2004/0216924 A1 | 11/2004 | Pietras et al. | |
| 2005/0000691 A1 | 1/2005 | Giroux et al. | |
| 2005/0173154 A1 | 8/2005 | Lesko | |
| 2005/0206163 A1 | 9/2005 | Guesnon et al. | |
| 2005/0257933 A1 | 11/2005 | Pietras | |
| 2005/0269072 A1 | 12/2005 | Folk et al. | |
| 2005/0269104 A1 | 12/2005 | Folk et al. | |
| 2005/0269105 A1 | 12/2005 | Pietras | |
| 2005/0274508 A1 | 12/2005 | Folk et al. | |
| 2006/0037784 A1 | 2/2006 | Walter et al. | |
| 2006/0124353 A1 | 6/2006 | Juhasz et al. | |
| 2006/0151181 A1 | 7/2006 | Shahin | |
| 2006/0180315 A1 | 8/2006 | Shahin et al. | |
| 2007/0030167 A1 | 2/2007 | Li et al. | |
| 2007/0044973 A1 | 3/2007 | Fraser et al. | |
| 2007/0074588 A1 | 4/2007 | Harata et al. | |
| 2007/0074874 A1 | 4/2007 | Richardson | |
| 2007/0102992 A1 | 5/2007 | Jager | |
| 2007/0131416 A1 | 6/2007 | Odell, II et al. | |
| 2007/0140801 A1 | 6/2007 | Kuttel et al. | |
| 2007/0144730 A1 | 6/2007 | Shahin et al. | |
| 2007/0158076 A1 | 7/2007 | Hollingsworth, Jr. et al. | |
| 2007/0251699 A1 | 11/2007 | Wells et al. | |
| 2007/0251701 A1 | 11/2007 | Jahn et al. | |
| 2007/0257811 A1 | 11/2007 | Hall et al. | |
| 2008/0059073 A1 | 3/2008 | Giroux et al. | |
| 2008/0093127 A1 | 4/2008 | Angman | |
| 2008/0099196 A1 | 5/2008 | Latiolais et al. | |
| 2008/0125876 A1 | 5/2008 | Boutwell | |
| 2008/0202812 A1 | 8/2008 | Childers et al. | |
| 2008/0308281 A1 | 12/2008 | Boutwell, Jr. et al. | |
| 2009/0151934 A1 | 6/2009 | Heidecke et al. | |
| 2009/0159294 A1 | 6/2009 | Abdollahi et al. | |
| 2009/0200038 A1 | 8/2009 | Swietlik et al. | |
| 2009/0205820 A1 | 8/2009 | Koederitz et al. | |
| 2009/0205827 A1 | 8/2009 | Swietlik et al. | |
| 2009/0205836 A1 | 8/2009 | Swietlik et al. | |
| 2009/0205837 A1 | 8/2009 | Swietlik et al. | |
| 2009/0229837 A1 | 9/2009 | Wiens et al. | |
| 2009/0266532 A1 | 10/2009 | Revheim et al. | |
| 2009/0272537 A1 | 11/2009 | Alikin et al. | |
| 2009/0274544 A1 | 11/2009 | Liess | |
| 2009/0274545 A1 | 11/2009 | Liess et al. | |
| 2009/0316528 A1 | 12/2009 | Ramshaw et al. | |
| 2009/0321086 A1 | 12/2009 | Zimmermann | |
| 2010/0032162 A1 | 2/2010 | Olstad et al. | |
| 2010/0101805 A1 | 4/2010 | Angelle et al. | |
| 2010/0200222 A1 | 8/2010 | Robichaux et al. | |
| 2010/0206552 A1 | 8/2010 | Wollum | |
| 2010/0206583 A1 | 8/2010 | Swietlik et al. | |
| 2010/0206584 A1 | 8/2010 | Clubb et al. | |
| 2010/0236777 A1 | 9/2010 | Partouche et al. | |
| 2011/0036586 A1 | 2/2011 | Hart et al. | |
| 2011/0039086 A1 | 2/2011 | Graham et al. | |
| 2011/0088495 A1 | 4/2011 | Buck et al. | |
| 2011/0214919 A1 | 9/2011 | McClung, III | |
| 2011/0280104 A1 | 11/2011 | McClung, III | |
| 2012/0048574 A1 | 3/2012 | Wiens et al. | |
| 2012/0152530 A1 | 6/2012 | Wiedecke et al. | |
| 2012/0160517 A1 | 6/2012 | Bouligny et al. | |
| 2012/0212326 A1 | 8/2012 | Christiansen et al. | |
| 2012/0234107 A1 | 9/2012 | Pindiprolu et al. | |
| 2012/0298376 A1 | 11/2012 | Twardowski | |
| 2013/0055858 A1 | 3/2013 | Richardson | |
| 2013/0056977 A1 | 3/2013 | Henderson et al. | |
| 2013/0062074 A1 | 3/2013 | Angelle et al. | |
| 2013/0075077 A1 | 3/2013 | Henderson et al. | |
| 2013/0075106 A1 | 3/2013 | Tran et al. | |
| 2013/0105178 A1 | 5/2013 | Pietras | |
| 2013/0207382 A1 | 8/2013 | Robichaux | |
| 2013/0207388 A1 | 8/2013 | Jansson et al. | |
| 2013/0233624 A1 | 9/2013 | In | |
| 2013/0269926 A1 | 10/2013 | Liess et al. | |
| 2013/0271576 A1 | 10/2013 | Elllis | |
| 2013/0275100 A1 | 10/2013 | Ellis et al. | |
| 2013/0299247 A1 | 11/2013 | Küttel et al. | |
| 2014/0090856 A1 | 4/2014 | Pratt et al. | |
| 2014/0116686 A1 | 5/2014 | Odell, II et al. | |
| 2014/0131052 A1 | 5/2014 | Richardson | |
| 2014/0202767 A1 | 7/2014 | Feasey | |
| 2014/0233804 A1 | 8/2014 | Gustavsson et al. | |
| 2014/0262521 A1 | 9/2014 | Bradley et al. | |
| 2014/0305662 A1 | 10/2014 | Giroux et al. | |

(56) References Cited

U.S. PATENT DOCUMENTS

| | | |
|---|---|---|
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0218894 A1 | 8/2015 | Slack |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0169430 A1* | 6/2016 | Tiberghien ............ F16L 37/42 285/82 |
| 2016/0215592 A1 | 7/2016 | Helms et al. |
| 2016/0230481 A1 | 8/2016 | Misson et al. |
| 2016/0376863 A1 | 12/2016 | Older et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2010057221 A2 | 5/2010 |
| WO | 2012021555 A2 | 2/2012 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |
| WO | 2017040508 A1 | 3/2017 |

OTHER PUBLICATIONS

EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
A123 System; 14Ah Prismatic Pouch Cell; Nanophosphate® Lithium-Ion; www.a123systems.com; date unknown; 1 page.
STREICHER Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
WARRIOR; 250E Electric Top Drive (250-TON); 250H Hydraulic Top Drive (250-TON); dated Apr. 2014; 4 total pages.
Hydraulic Pumps & Motors; Fundamentals of Hydraulic Motors; dated Jun. 26, 2014; 6 total pages.
WARRIOR; Move Pipe Better; 500E Electric Top Drive (500 ton—1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.

(56) References Cited

OTHER PUBLICATIONS

PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages
PCT Notification of Transmittal of the International Search Report and the Written Opinion of the International Searching Authority for International Application No. PCT/US2017/014646; dated Apr. 4, 2017; 14 total pages
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
PCT International Search Report and Written Opinion dated Oct. 23, 2018, for International Application No. PCT/US2018/044162.
EPO Extended European Search Report dated Nov. 15, 2018, for European Application No. 18177311.0.
EPO Partial Search Report dated Dec. 4, 2018, for European Patent Application No. 16754089.7.
PCT International Search Report and Written Opinion dated Dec. 19, 2018, for International Application No. PCT/US2018/042813.
PCT International Search Report and Written Opinion dated Jan. 3, 2019, for International Application No. PCT/US2018/0429021.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoilLOK™ Brochure, "Highest integrity hand-held coiled tubing handling tools," 2 pages.

* cited by examiner

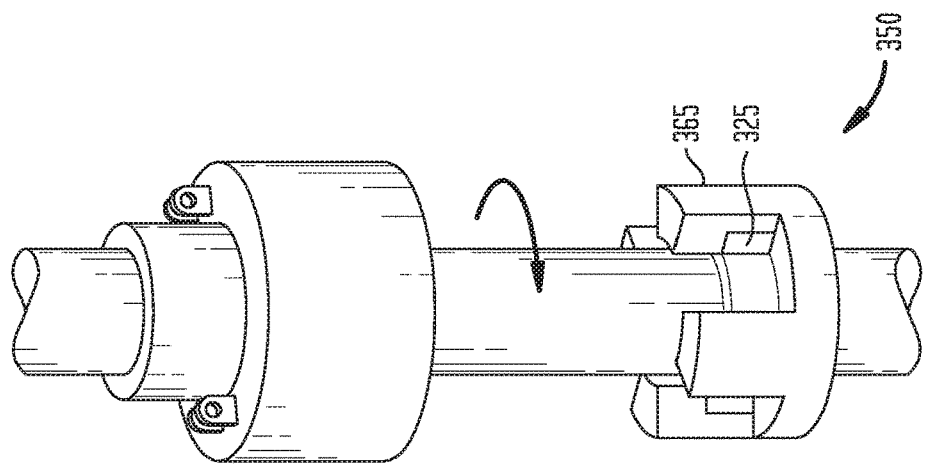
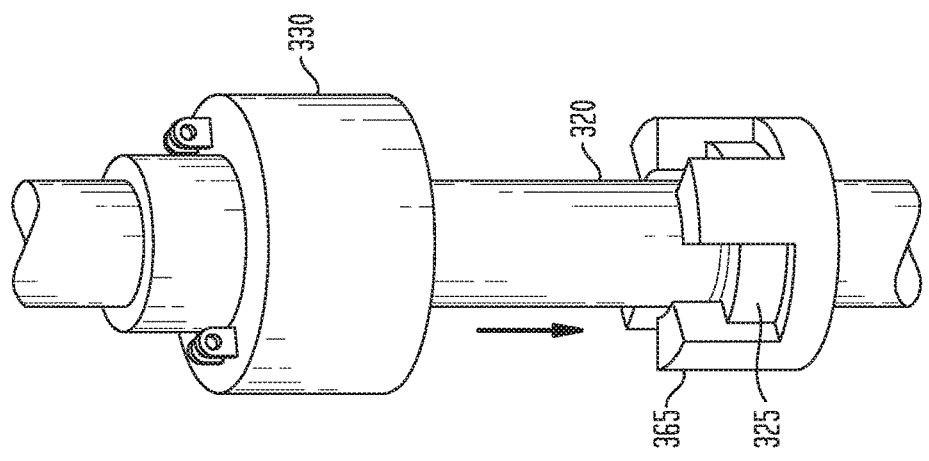
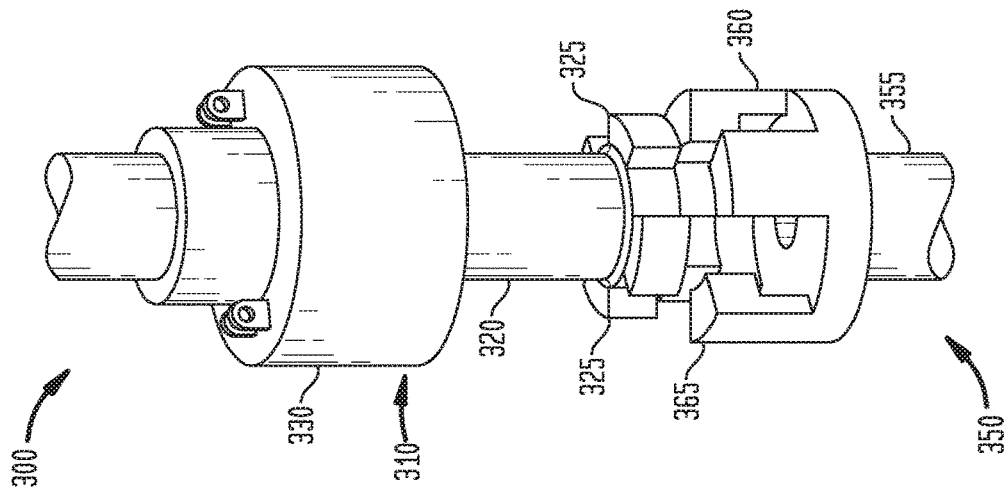

FIG. 10A
FIG. 10B
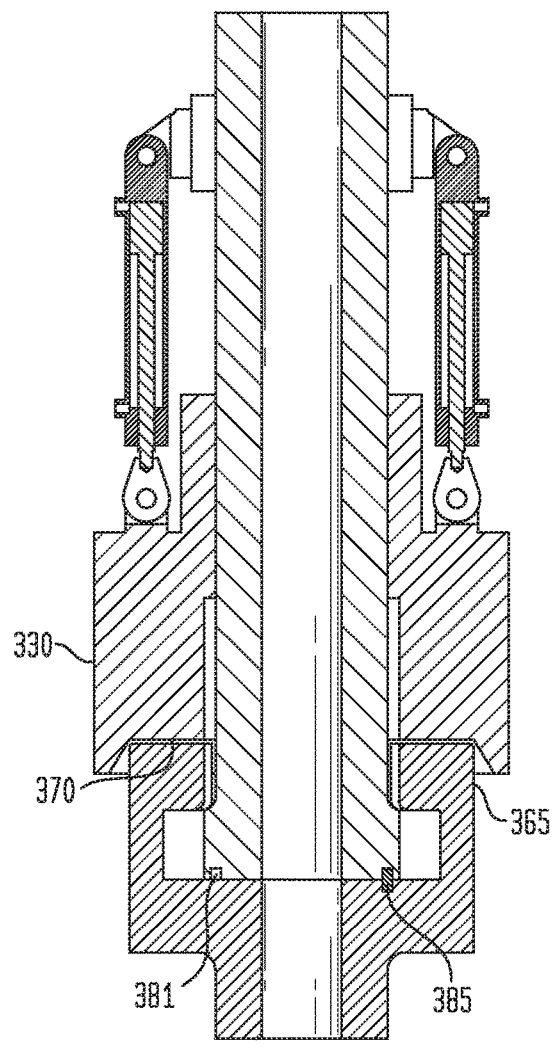
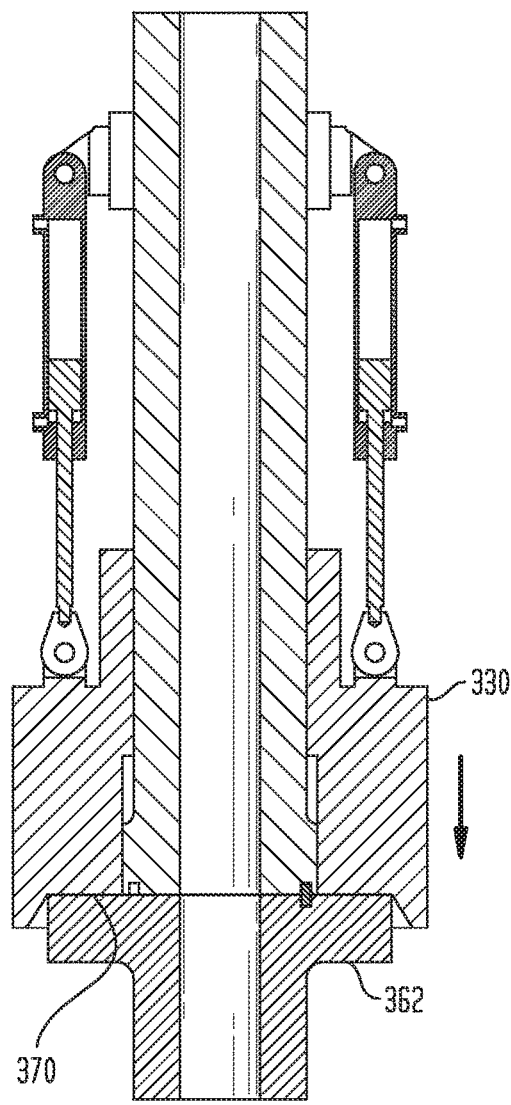

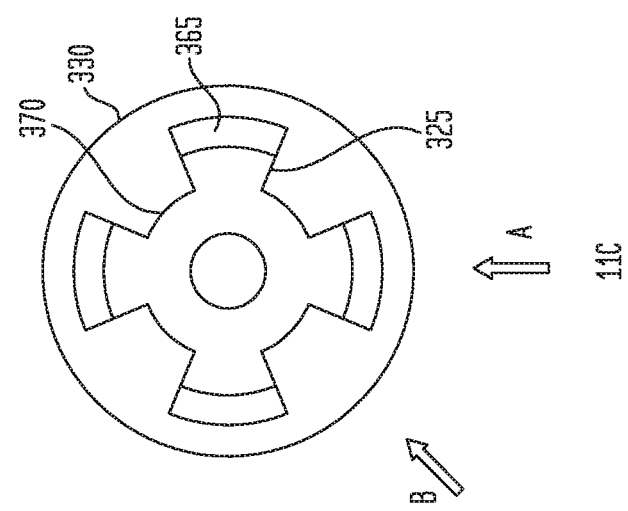
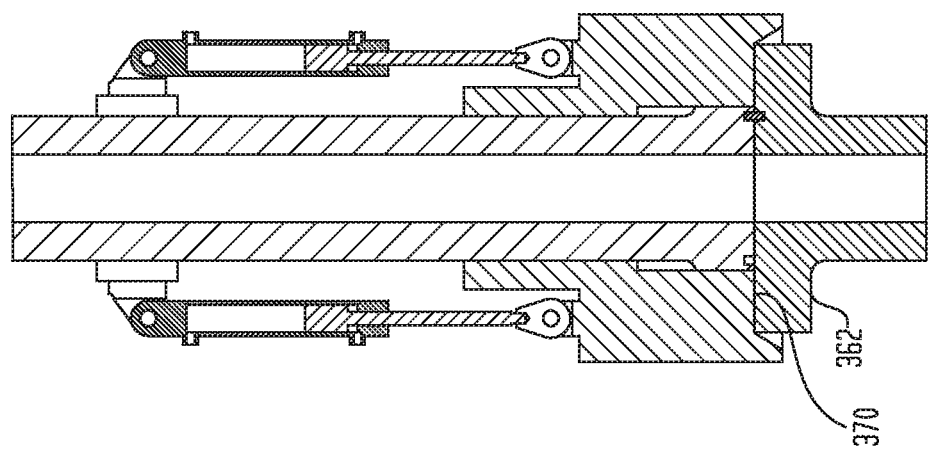
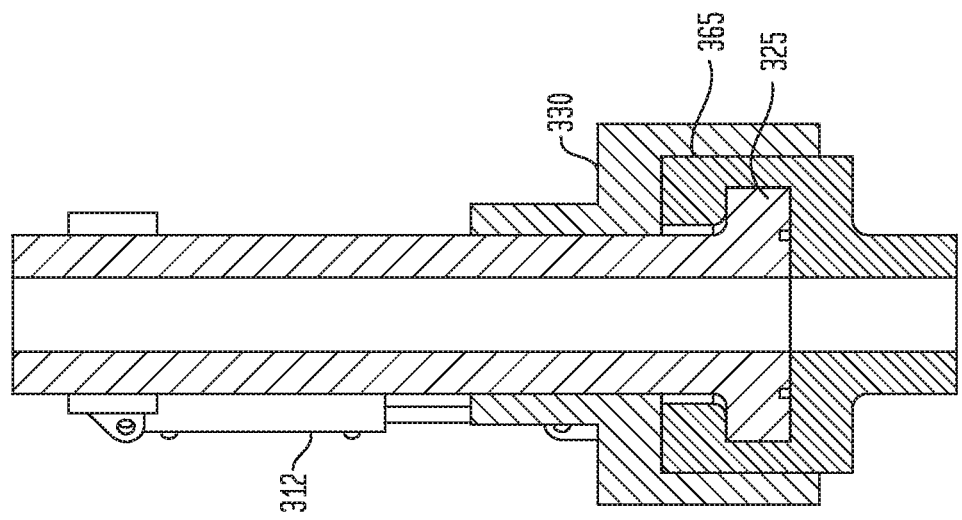

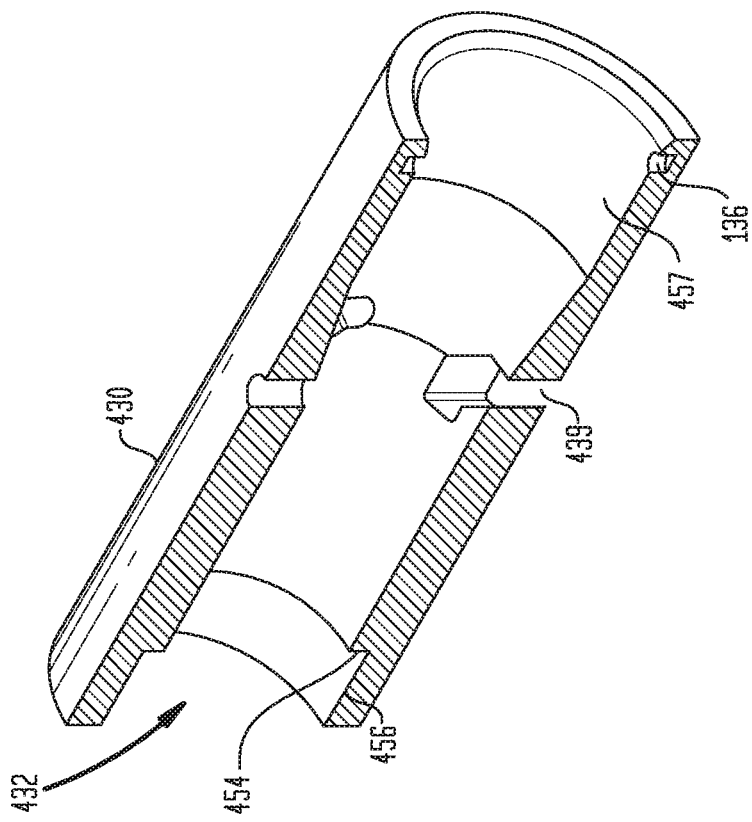
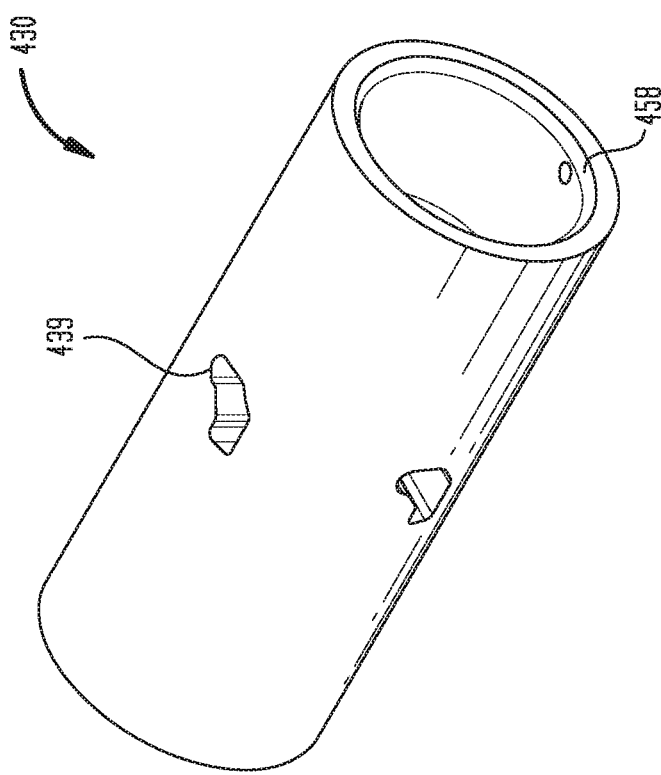

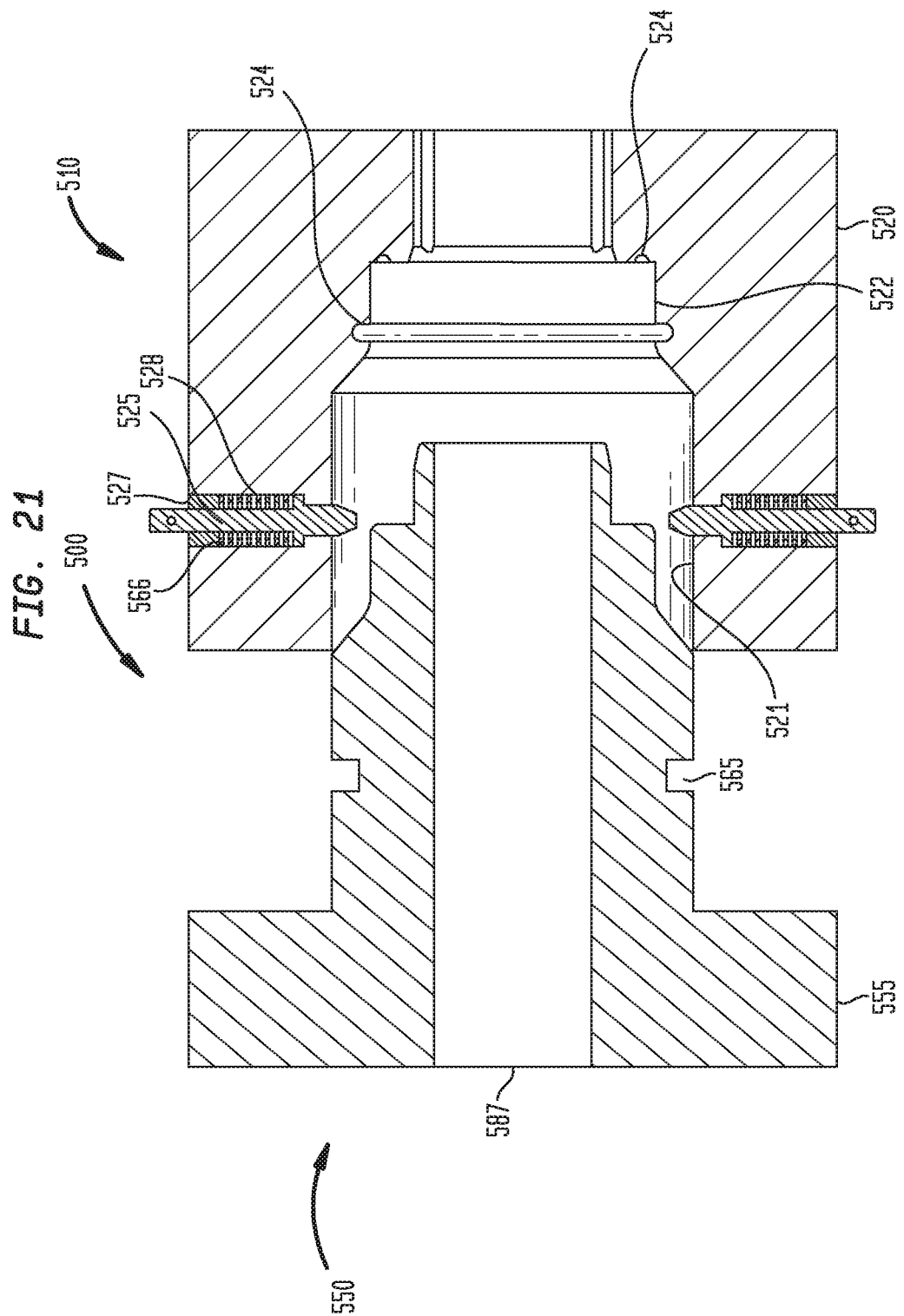

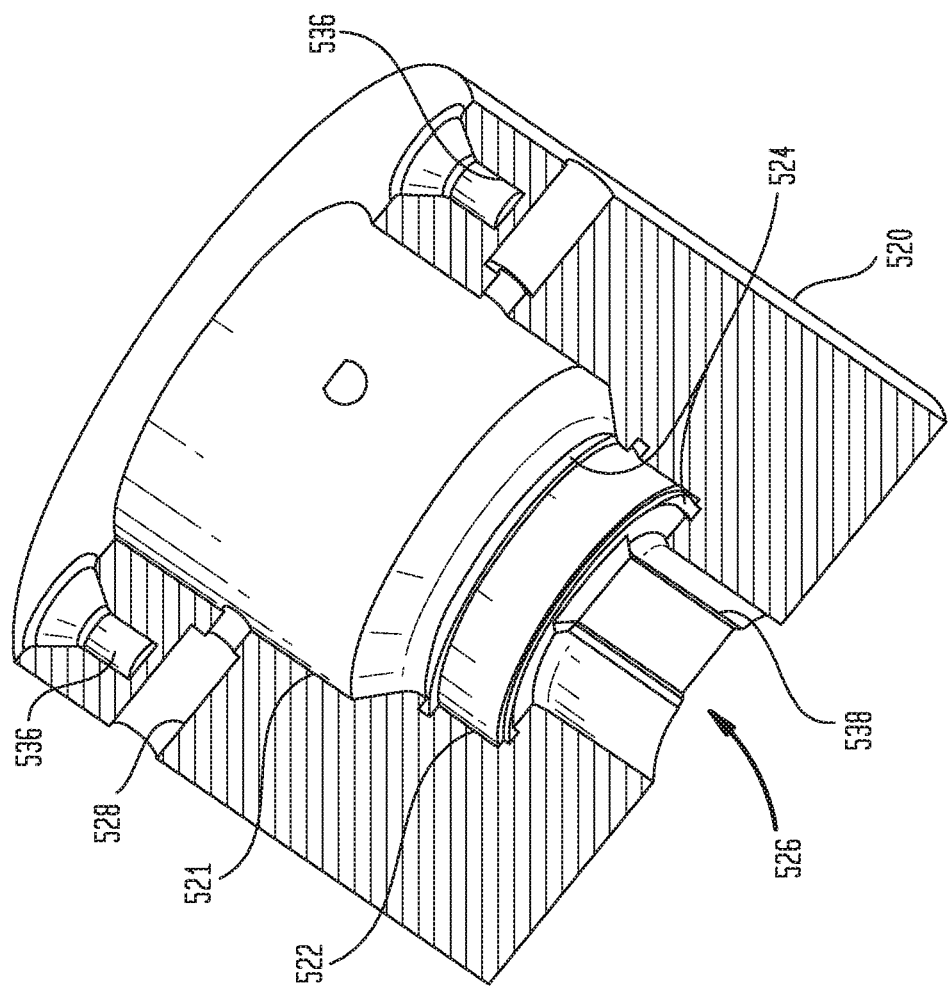

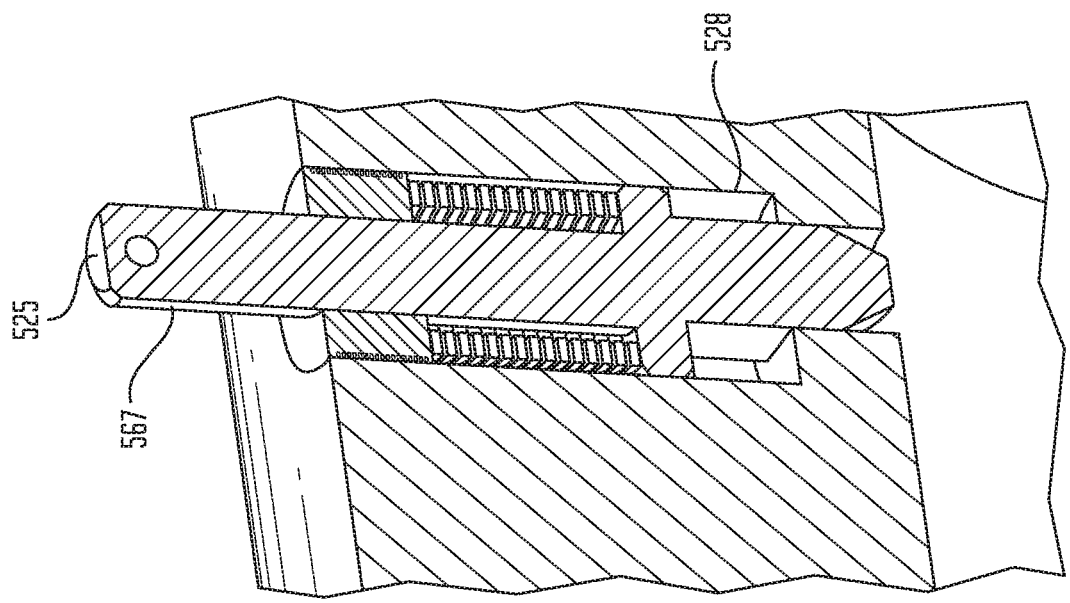
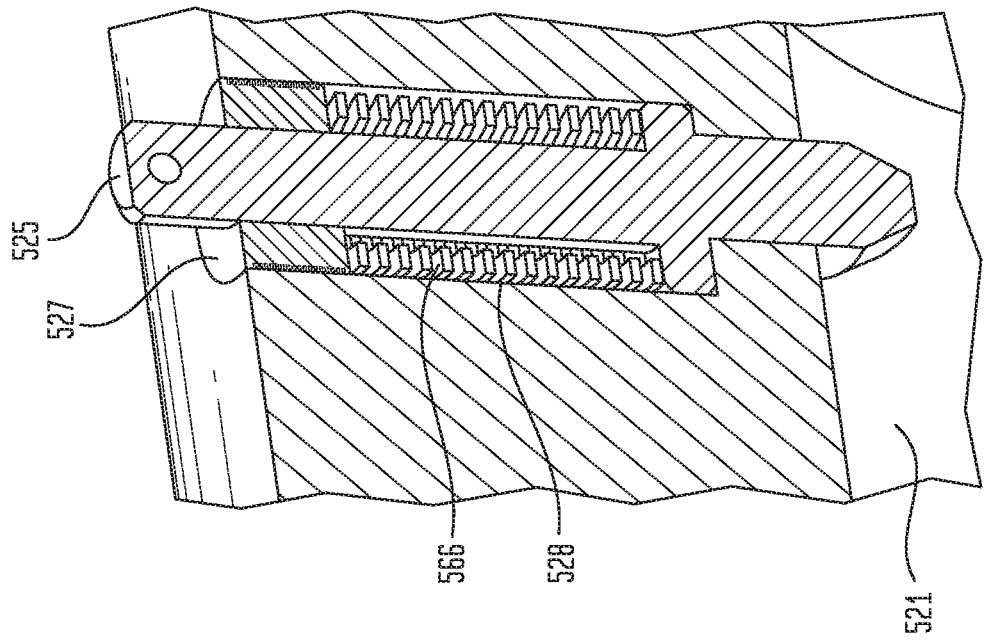

COMBINED MULTI-COUPLER WITH ROTATING LOCKING METHOD FOR TOP DRIVE

BACKGROUND

Embodiments of the present disclosure generally relate to equipment and methods for coupling one or more tools to a top drive. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with threaded connections. Such threaded connections are capable of transferring load. Right-hand (RH) threaded connections are also capable of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

There is, therefore, a need for a coupler to capable of addressing at least one of the problems described above.

SUMMARY OF THE DISCLOSURE

The present disclosure generally relates to equipment and methods for coupling a top drive to one or more tools. The coupling may transfer both axial load and torque bi-directionally from the top drive to the one or more tools.

In one embodiment, a tool coupler includes a first component having a tubular body and a locking member and a second component. The second component includes a housing having an opening for receiving the tubular body; a locking ring having a latch; an axial channel; and a recess for receiving the locking member, wherein the latch is positioned in the channel to retain the locking member in the recess.

In one embodiment, a tool coupler includes a first component having a tubular body and a plurality of circumferentially spaced locking receivers; and a second component having a housing having a tubular body and a plurality of locking members, wherein the plurality of locking receivers is rotatable into engagement with the plurality of locking members to axially lock the first component to the second component; and a locking housing disposed around and axially movable relative to the tubular body. The locking housing includes an opening for receiving the plurality of locking receivers; and a plurality of latches disposed in the opening, wherein the plurality of latches is disposable between the plurality of locking receivers to rotationally lock the first component to the second component.

In one embodiment, a tool coupler includes a first component having a tubular body and a plurality of circumferentially spaced locking receivers disposed in a bore of the tubular body; and a second component. The second component having an outer housing having a tubular body, the outer housing having an alignment member for engaging the first component; a coupling body disposed in the outer housing, the coupling body having a plurality of locking members, wherein the plurality of locking members is rotatable into engagement with the plurality of locking receivers of the first component to axially lock the first component to the second component; and an actuator for moving the coupling body relative to the outer housing.

In one embodiment, a tool coupler includes a first component having a tubular body; a locking receiver formed on an outer surface of the tubular body; and an alignment feature. The tool coupler also includes a second component having a coupling body having a bore for receiving the tubular body of the first component; a locking member disposed in the coupling body for engaging the locking receiver; and a complementary alignment feature for engaging the alignment feature of the first component.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7A illustrates an exemplary tool coupler for use with a top drive system according to embodiments of the present disclosure.

FIGS. 7A-7C illustrate steps in an exemplary process for coupling the receiver assembly to the tool adapter of the tool coupler of FIG. 7A.

FIGS. 8A-8C illustrate cross-sectional views of steps in an exemplary process for coupling the receiver assembly to the tool adapter of the tool coupler of FIG. 7A.

FIGS. 10A and 10B illustrate cross-sectional views of steps in an exemplary process for coupling the receiver assembly to the tool adapter of the tool coupler of FIG. 7A.

FIGS. 11A-11C are different cross-sectional views of the tool coupler of FIG. 7A after lowering the outer housing.

FIG. 16 is a perspective view of the outer body of the tool coupler of FIG. 13. FIG. 16A is a cross-sectional view of the outer body of FIG. 16.

FIG. 21 illustrates an exemplary tool coupler for use with a top drive system according to embodiments of the present disclosure.

FIG. 22 is a cross-sectional view of the coupling body of the tool coupler of FIG. 21.

FIG. 22A shows the locking member of the tool coupler of FIG. 21 in a locked position.

FIG. 22B shows the locking member of the tool coupler of FIG. 21 in an unlocked position.

DETAILED DESCRIPTION

The present disclosure provides equipment and methods for coupling a top drive to one or more tools. In one embodiment, a tool coupler is used to couple a tool to the top drive. The tool coupler may transfer torque bi-directionally from the top drive to the one or more tools. The tool coupler may provide mechanical, electrical, optical, hydraulic, and/or pneumatic connections. The tool coupler may convey torque, load, data, signals, and/or power. tool coupler Some of the many benefits provided by embodiments of this disclosure include a tool coupler having a simple mechanism that is low maintenance. Benefits also include a reliable method to transfer full bi-directional torque, thereby reducing the risk of accidental breakout of threaded connections along the tool string. Embodiments may also provide automatic connection for power and data communications.

Figure 1:
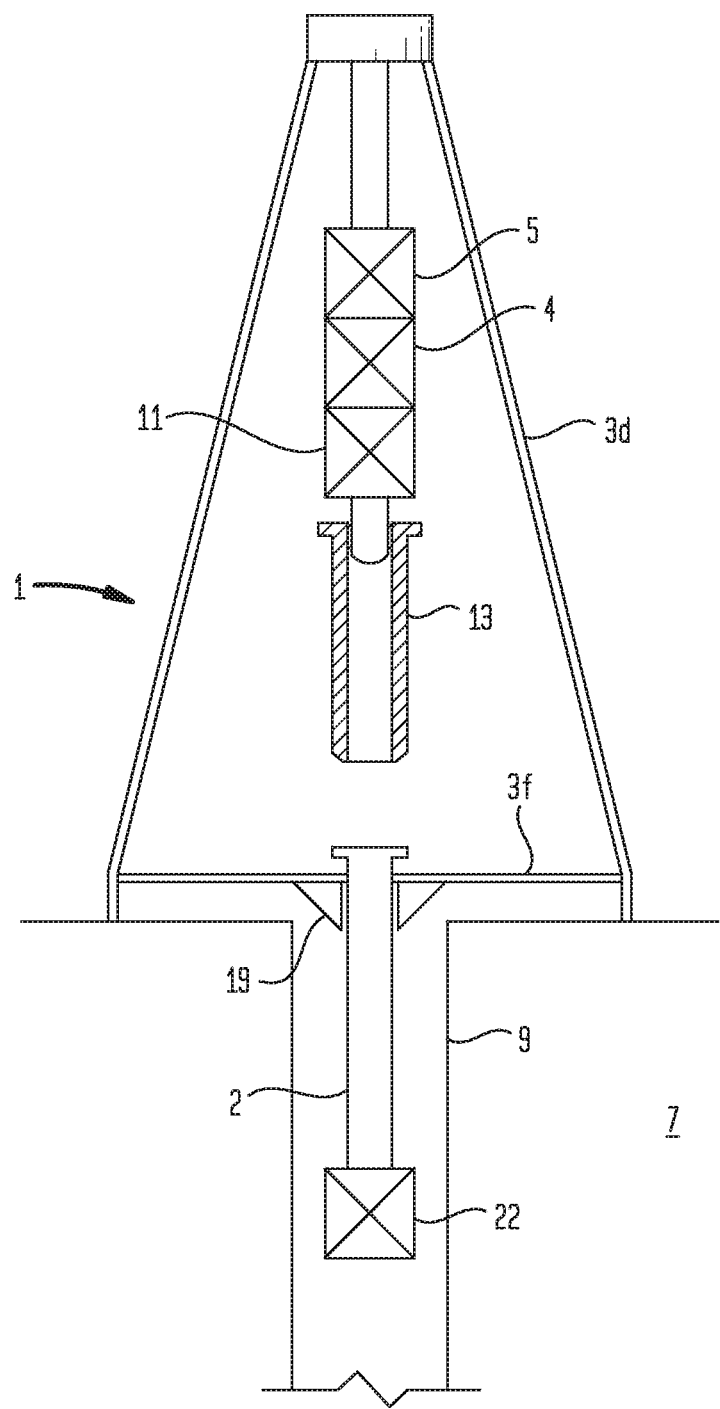
FIG. 1 illustrates an exemplary drilling system, according to embodiments of the present disclosure.

FIG. 1 illustrates a drilling system 1, according to embodiments of the present disclosure. The drilling system 1 may include a drilling rig derrick 3d and a drilling rig floor 3f. As illustrated, the drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by a threaded connection. The top drive 4 may be used to handle a tubular 13 or a tool string 2. At various times, the top drive 4 may support the axial load of the tool string 2. The rig floor 3f may have an opening through which the tool string 2 extends downwardly into a wellbore 9. The rig floor 3f may include slips 19 to support the axial load of tool string 2 at various times. The top drive 4 may include a drive unit to provide torque to the tool string 2, for example to operate a drill bit 22 near the bottom of the wellbore 9. A tool 11 may be attached to the top drive 4 to facilitate performance of a wellbore operation, such a tubular makeup operation or cementing operation. Exemplary tools 11 include tubular gripping tools configured to grip an inner surface or an outer surface of the tubular, fill up tool, compensation tool, cementing tool, and elevators. In one example, the tubular 13 may be a drill pipe, and the tool string 2 may include joints of drill pipe connected together, such as by a threaded connection.

At various times, the top drive 4 may provide right hand (RH) or left hand (LH) torque to tool string 2, for example to make up or break out joints of drill pipe. Power and/or signals may be communicated between the top drive 4 and the tool string 2. For example, pneumatic, hydraulic, electrical, optical, or other power and/or signals may be communicated between top drive 4 and tool string 2.

Figure 2:
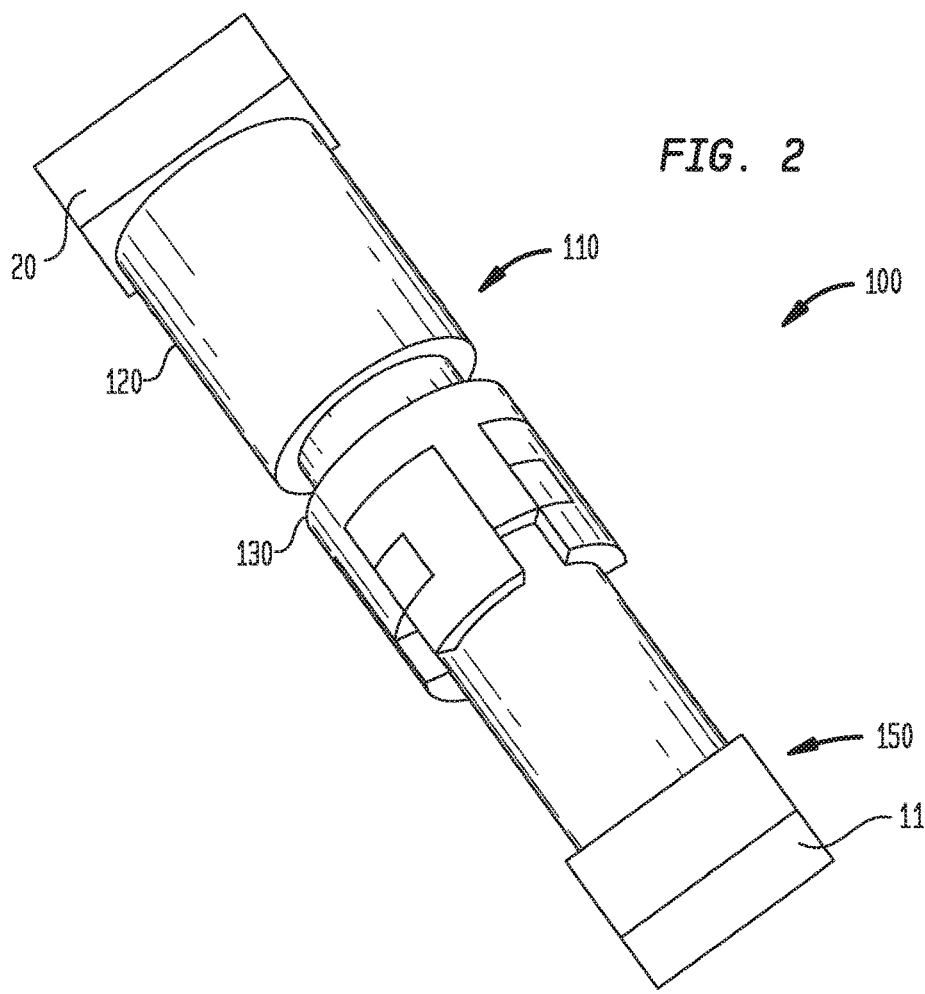
FIG. 2 illustrates an exemplary tool coupler for use with a top drive system according to embodiments of the present disclosure.

FIG. 2 illustrates a tool coupler 100 for use with a top drive system (e.g., top drive 4 in FIG. 1) according to one embodiment. The tool coupler 100 is used to facilitate the connection of a tool 11 to the top drive 4. In some embodiments, the tool coupler is a multi-coupler for supporting load, transferring torque, and having couplings to transfer power, including hydraulic, electric, data, and/or pneumatic. In one embodiment, the tool coupler 100 includes a receiver assembly 110 and a tool adapter 150. The receiver assembly 110 is coupled to the top drive 4, and the tool adapter 150 is coupled to the tool. The tool adapter 150 is engageable with the receiver assembly 110 to connect the tool to the top drive 4.

Figure 3:
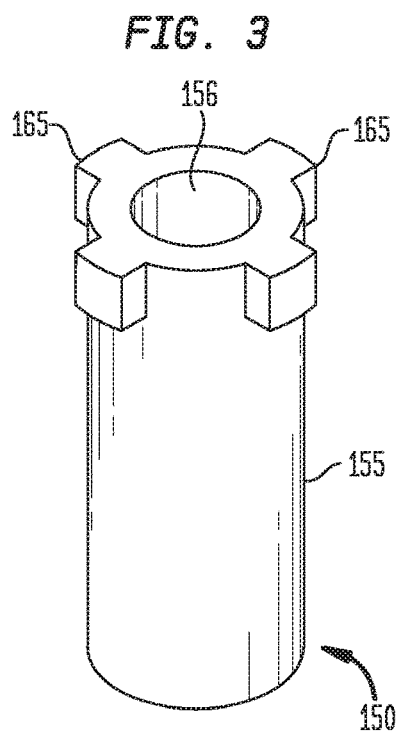
FIG. 3 illustrates an exemplary tool adapter of the tool coupler of FIG. 2.

FIG. 3 illustrates an exemplary embodiment of a tool adapter 150. The tool adapter 150 includes a tubular body 155 having a bore 156 therethrough and a plurality of locking members 165 disposed on the tubular body 155. The bottom of the tubular body 155 may be connected to the tool via a threaded connection or may be integrated with the tool.

In one embodiment, the plurality of locking members 165 is disposed circumferentially around the tubular body 155, as shown in FIG. 3. The locking members 165 are disposed on the outer surface and protrude outwardly in a radial direction. In this example, four locking members 165 disposed around the tubular body 155. The locking members 165 have are square shaped keys, but can have any suitable shape for mating with the receiver assembly 110, such as rectangular shape or other suitable polygonal shape. While four locking members 165 are shown, it is contemplated that two, three, five, six, seven, eight, or more locking members 165 may be used. In another embodiment, the tool adapter 150 may have two rows of locking members 165 that are axially spaced from each other.

Referring back to FIG. 2, the receiver assembly 110 generally includes a tubular body 120, a locking mechanism 130, and an actuator 112 for moving the locking mechanism 130 axially relative to the tubular body 120. An optional swivel connector is provided to transfer hydraulics, pneumatics, and/or electronics from the top drive 4 to the tool and from the tool to the top drive 4.

Figure 4:
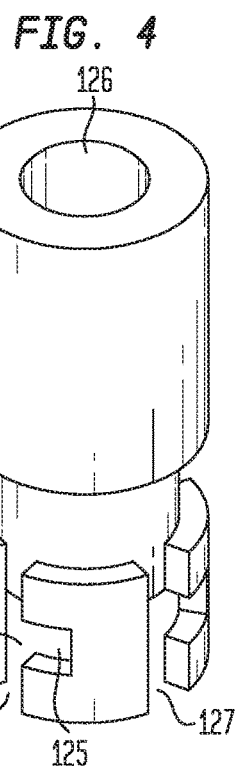
FIG. 4 illustrates an exemplary tubular body of the tool receiver of the tool coupler of FIG. 2.

FIG. 4 illustrates a cross-sectional view of the tubular body 120. The tubular body 120 is integrated with or attached to a shaft 20 extending from the top drive 4. The tubular body 120 has a lower opening 122 for receiving the tool adapter 150. The lower opening 122 has an inner diameter that is sufficiently sized to receive the tool adapter 150. In this example, the inner diameter of the lower opening 122 is larger than the bore 126 of the tubular body 120. A plurality of channels 127 are circumferentially spaced around the lower opening 122 for accommodating the locking members 165 of the tool adapter 150. The channels 127 have a sufficiently width to permit axial movement of the locking members 165 in the channels 127. In this example, the lower opening 122 has four channels 127 for receiving the four locking members 165 of the tool adapter 155. A recess 125 is formed in the lower opening 122 in communication with the channels 127 for receiving the locking members 165. In one embodiment, the recess 125 has a shape that is complementary to the shape of the locking members 165. For example, the key recess 125 is shown with a square shape to complement the shape of the locking members 165.

The tubular body 120 has a recessed groove 123 formed on its outer surface. In this example, the recessed groove 123 has a diameter that is the same as the outer diameter of the tubular body 155 of the tool adapter 150. In this example, the upper ends of the channels 127 are open to the recessed groove 123.

Figure 5:
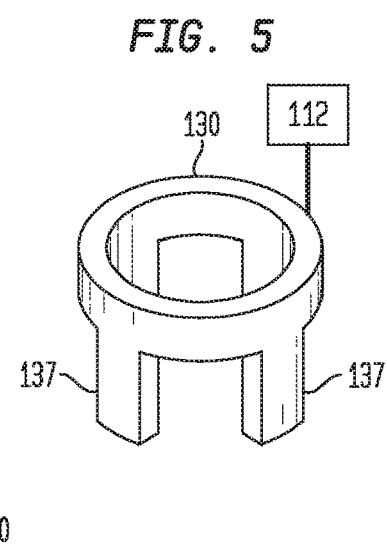
FIG. 5 illustrates an exemplary locking ring of the tool receiver of the tool coupler of FIG. 2.

The locking mechanism 130 is disposed around the recessed groove 123. In this example, the locking mechanism is a locking ring 130. The locking ring 130 is axially movable in the recesses groove 123. The locking ring 130 may have an inner diameter that is about the same size as the diameter of the recessed groove 123. The locking ring 130 includes one or more of locking devices such as latches 137 circumferentially spaced around the locking ring 130. See also FIG. 5. The latches 137 extend below the locking ring 130 and at least partially into the channels 127. In one example, the latches 137 have a width that is about the same as the width of the channels 127. The length of the latches 137 is sized such that when the locking ring 130 is in an upper position in the groove 123, the lower end of the latches 137 is above the recess 123. In this respect, the latches 137 do not block access to the recess 123. Also, the length of the latches 137 is sized such that when the locking ring 130 is in a lower position, the latches 137 at least partially block the recess 125. In this example, the latches 137 are long enough to extend across the recess 125 as shown in FIG. 2. In this example, the locking ring 130 includes four latches 137 to match the number of channels 127. However, it is contemplated that the number of latches 137 can be less than the number of channels, such as one, two, or three latches.

In one embodiment, an actuator 112 is provided for moving the locking ring 130 in the recessed groove 123 between the upper, unlatched position and the lower, latched position. The actuator 112 may be an electric actuator, pneumatic actuator, or a hydraulic actuator. In one example, the actuator is a piston and cylinder assembly. In another embodiment, an optional biasing member such as a spring may be used to bias the locking ring 130 in the lower position in the groove 123.

Figure 6A:
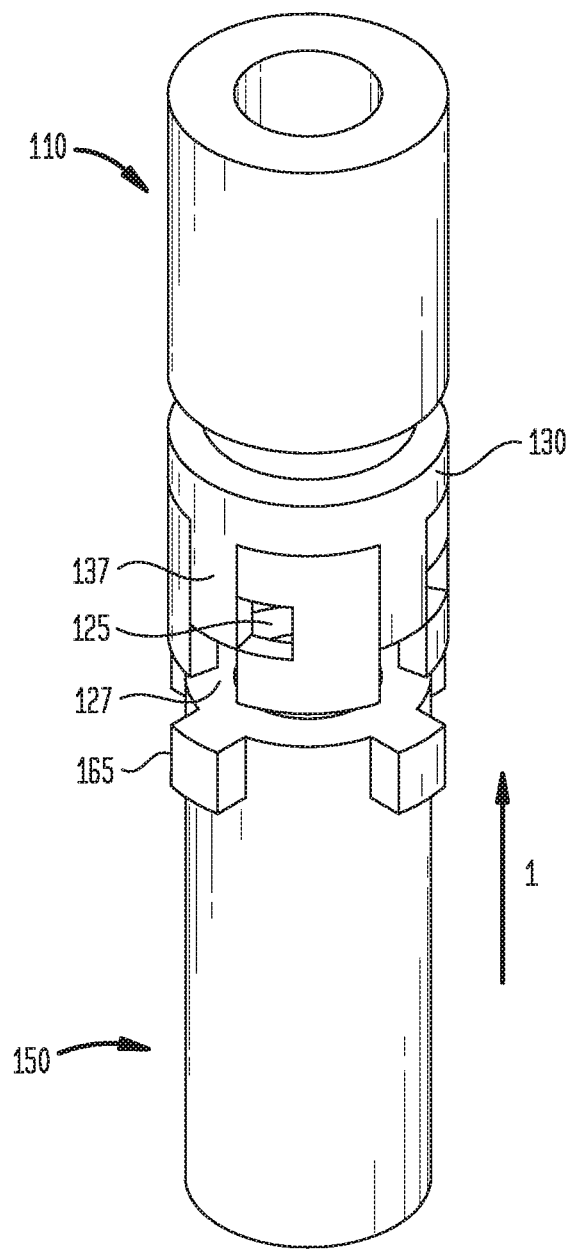
FIGS. 6A and 6B illustrate an exemplary process for coupling the receiver assembly to the tool adapter of the tool coupler of FIG. 2.

In operation, the tool coupler 100 is used to connect a tool to a top drive 4. Exemplary tools include tubular gripping tools configured to grip an inner surface or an outer surface of the tubular, fill up tool, compensation tool, cementing tool, and elevators. The tool adapter 150 is integrated with or connected to the tool. The tool receiver 110 is coupled to or integrated with the shaft of the top drive 4. Referring to FIG. 6A, the tool receiver 110 is ready to receive the tubular body 155 of the tool adapter 150. The locking ring 130 and its latches 137 are in the lower position, which may be due to the actuator 112 or the spring.

Figure 6B:
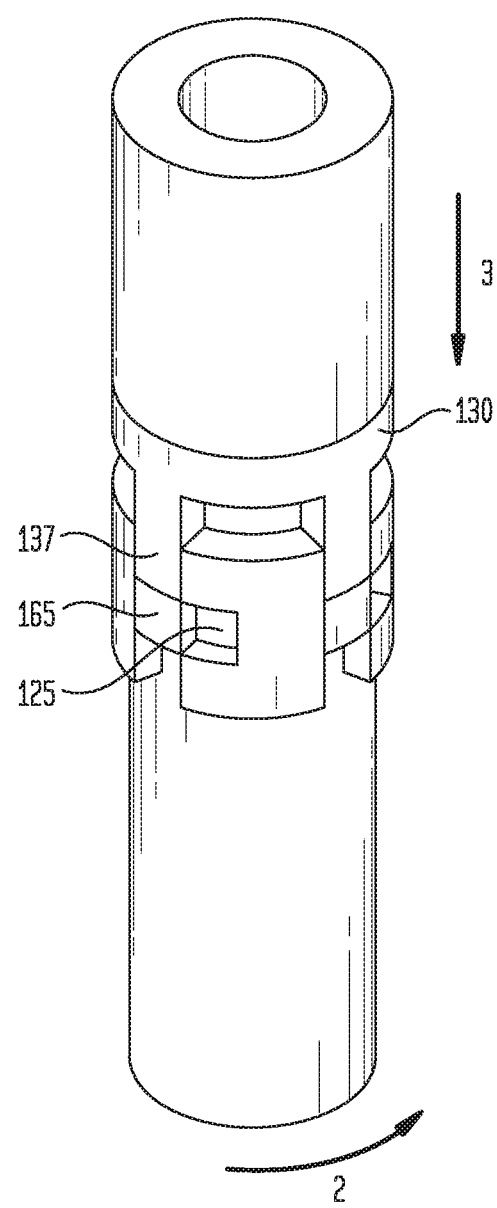

Before inserting the tool adapter 150, the locking keys 165 are aligned with the complementary channels 127 of the tubular body 120. The tubular body 155 is inserted into the opening 122 of the tubular body 120. During insertion, locking keys 165 are moved axially inside the channels 127. The upper end of the locking keys 165 will contact the lower end of the latches 137 and urge the latches 137 to move upward to the upper position. When the keys 165 are laterally aligned with the recess 125, the tool adapter 150 is rotated to the right relative to the tubular body 120 to move the keys 165 inside the recess 125, as shown in FIG. 6B. In another embodiment, the tubular body 120 is rotated to the left relative to the keys 165 to position the keys 165 inside the recess 125. Because the keys 165 are no longer in the channels 127, the locking ring 130 can move back down to the lower position. The locking ring 130 may move downwardly due to the actuator 112, the spring, or both. FIG. 2 shows the tool adapter 150 coupled to the tubular body 120 and locked by the locking ring 130.

FIG. 7A illustrates a tool coupler 300 for use with a top drive system (e.g., top drive 4 in FIG. 1) according to one embodiment. FIG. 8A illustrates a cross-sectional view of the tool coupler 300 of FIG. 7A. The tool coupler 300 is used to facilitate the connection of a tool 11 to the top drive 4. In some embodiments, the tool coupler 300 is a multi-coupler for supporting load, transferring torque, and having couplings to transfer power, including hydraulic, electric, data, and/or pneumatic. In one embodiment, the tool coupler 300 includes a receiver assembly 310 and a tool adapter 350. The receiver assembly 310 is coupled to the top drive 4, and the tool adapter 350 is coupled to the tool. The tool adapter 350 is engageable with the receiver assembly 310 to connect the tool to the top drive 4.

The receiver assembly 310 generally includes a tubular body 320, a locking mechanism 330, and an actuator 312 for moving the locking mechanism 330 axially relative to the tubular body 320. An optional swivel connector may be provided to transfer hydraulics, pneumatics, and/or electronics from the top drive 4 to the tool and from the tool to the top drive 4.

The tubular body 320 is integrated with or attached to a shaft 20 extending from the top drive 4. The upper end of the tubular body 320 may be attached to the shaft 20 via a threaded connection. The tubular body 320 includes a bore 326 extending therethrough and a plurality of locking members 325 disposed on the tubular body 320.

In one embodiment, the plurality of locking members 325 is disposed circumferentially around the tubular body 320, as shown in FIG. 7A. The locking members 325 are spaced apart on the outer surface and protrude outwardly in a radial direction. In one embodiment, the locking members 325 are locking keys 325. In this example, four locking keys 325 are disposed around the tubular body 320. The locking keys 325 may have an arcuate shape, but can have any suitable shape for mating with the tool adapter 350, such as rectangular shape or other suitable polygonal shape. In one example, the sides of the locking keys 325 extend radially outward. In this example, the locking members 325 are disposed at the lower end of the tubular body 320. While four locking members 325 are shown, it is contemplated that two, three, five, six, seven, eight, or more locking members 325 may be used.

As shown in FIG. 8A, the tool adapter 350 includes a tubular body 355 having a bore 357 therethrough. The bottom of the tubular body 355 may be connected to the tool via a threaded connection or may be integrated with the tool. The upper end of the tool adapter 350 includes a head 360 having a base 362 and a plurality of locking receivers 365. The locking receivers 365 are spaced apart circumferentially around the head 362 and extend upward from the base 362. The width of the locking receivers 365 are sized so they can fit between the gaps of adjacent locking keys 325 of the receiver assembly 310. Similarly, the gap between locking receivers 365 are sufficiently sized accommodate the locking keys 325 of the tubular body 320 of the receiver assembly 310. The inner diameter formed by the locking receivers 365 is larger than the outer diameter formed by the locking keys 325 of the receiver assembly 310. A shoulder 368 is disposed at an upper end of each locking receiver 365 and protrudes inwardly. The axial gap 366 between the shoulder 368 and the base 362 is sufficient to accommodate the height of the locking keys 325 of the receiver assembly 310.

Figure 9:
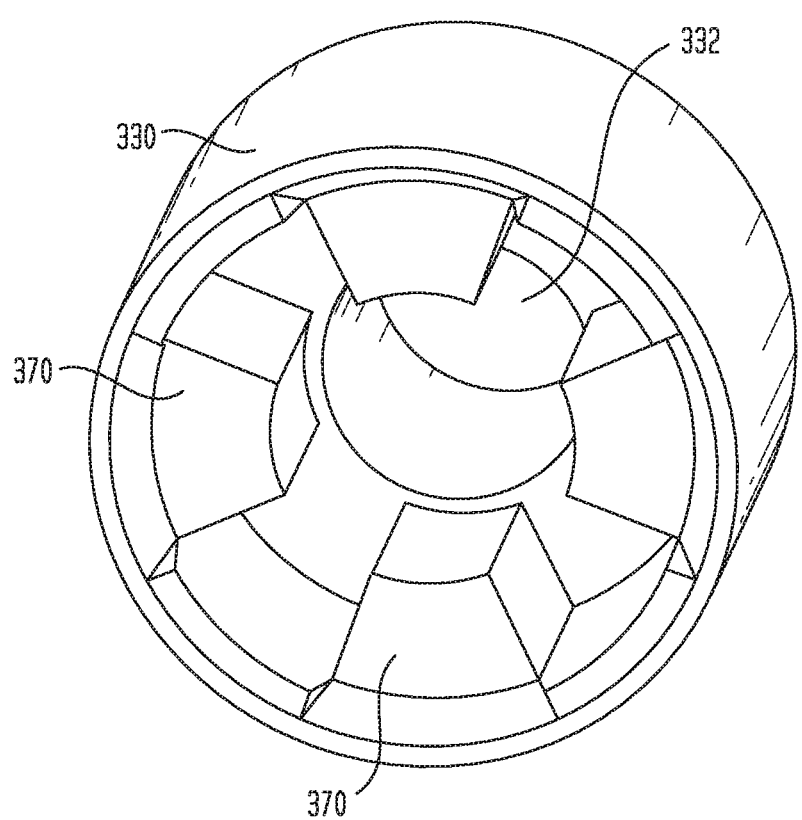
FIG. 9 illustrates an exemplary locking mechanism of the tool coupler of FIG. 7A.

Referring back to FIG. 7A, the receiver assembly 310 includes a locking mechanism 330 for rotationally locking the tool adapter 350 to the receiver assembly 310. In this example, the locking mechanism 330 is an outer housing 330, as shown in FIG. 9. The outer housing 330 is tubular shaped and includes a bore 332 for receiving the tubular body 320. The outer housing 330 has an interior opening having an inner diameter that is larger than the outer diameter of the base 362 and the locking receivers 365. In this respect, the outer housing 330 may be lowered and disposed over the head 360 of the tool adapter 350. A plurality of locking members 370 protrudes from the wall of the outer housing 330 into the interior opening. The plurality of locking members 370 is circumferentially spaced apart around the outer housing 330. In one example, the locking members are locking latches 370. The width of the locking latches 370 are sized so they can fit between the gaps of adjacent locking receivers 365 of the tool adapter 350. Similarly, the gap between locking latches 370 are sufficiently sized accommodate the locking receivers 365 of the tool adapter 350. The height of the locking latches 370 is such that, when lowered over the head 360, the lower end of the locking latches 370 will be below the upper end of the locking keys 325 of the tool receiver 310. In one example, the lower end of the locking latches 370 contacts the base 362. The radial length of the locking latches 370 is sized so that, when lowered over the head 360, the distal end of the locking latches 370 overlaps the distal end of the locking keys 325. In one example, the locking latches 370 overlaps radially at least 50%, 75%, and 90% of the radial length of the locking keys 325. In one example, the locking latches 370 taper radially inwardly.

Figure 12:
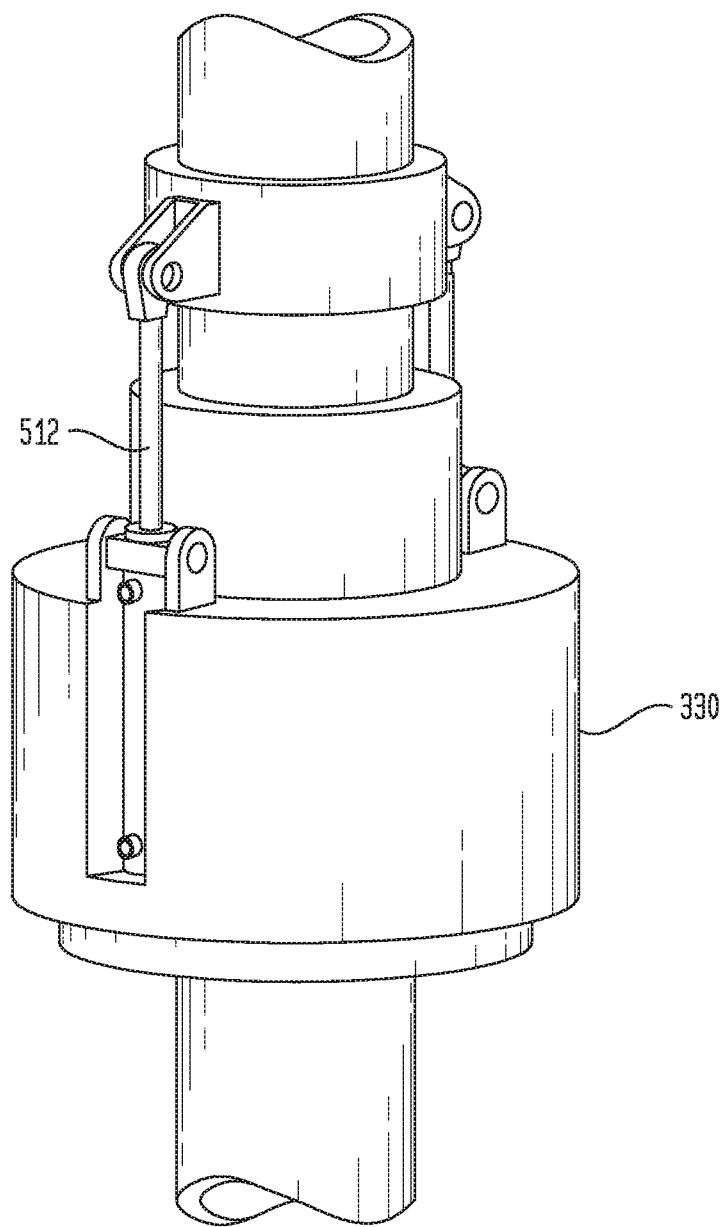
FIG. 12 illustrates another arrangement of the actuator of the tool coupler of FIG. 7A.

In one embodiment, an actuator 312 is provided for axially moving the outer housing 330 between an upper, unlatched position and the lower, latched position, relative to the tubular body 320. The actuator 312 may be an electric actuator, pneumatic actuator, or a hydraulic actuator. In one example, the actuator is a piston and cylinder assembly. As shown in FIG. 8A, the upper end of the piston and cylinder assembly 312 is coupled to the upper end of the tubular body 320, and a lower end of the piston and cylinder assembly 312 is coupled to the outer housing 330. FIG. 12 illustrates another arrangement of the actuator 512. In this embodiment, the piston and cylinder assembly 512 is coupled to a lower portion of the outer housing 330 to reduce the overall length of the tool coupler 300.

In operation, the tool coupler 300 is used to connect a tool to a top drive 4. Exemplary tools include tubular gripping tools configured to grip an inner surface or an outer surface of the tubular, fill up tool, compensation tool, cementing tool, and elevators. The tool adapter 350 is integrated with or connected to the tool. The tool receiver 310 is coupled to or integrated with the shaft of the top drive 4. Referring to FIG. 7A, the tool receiver 310 is ready to receive the head 360 of the tool adapter 350. In this view, the outer housing 330 has been raised. FIG. 8A illustrates a cross-sectional view of the connection process. In this view, the outer housing 330 is in the lower position. The outer housing 330 can be raised by actuator 312 or the upward force from the tool adapter 350.

Before inserting the tool adapter 350, the locking keys 325 of the tool receiver 310 are aligned with the gaps of the locking receivers 365 of the tool adapter 310. The locking keys 325 are inserted into the head 360 until the upper end of the locking keys 325 is below the lower end of the shoulders 368, as shown in FIGS. 7B and 8B. In one embodiment, the locking keys 325 are inserted until the bottom contacts the based 362. FIG. 7B shows the locking keys 325 positioned in the gaps between the locking receivers 365. However, the locking latches 370 are positioned above the locking receivers 365 as shown in FIG. 8B.

Figure 8C:
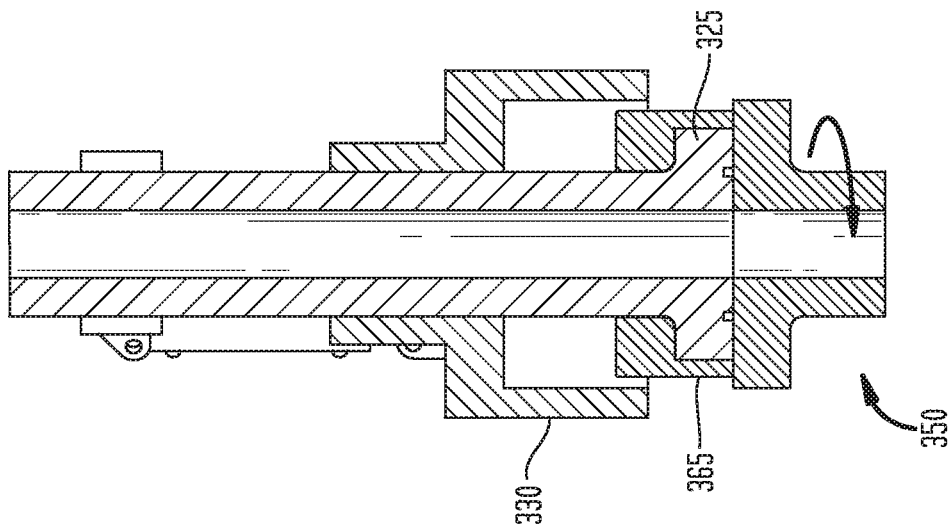
Figure 8B:
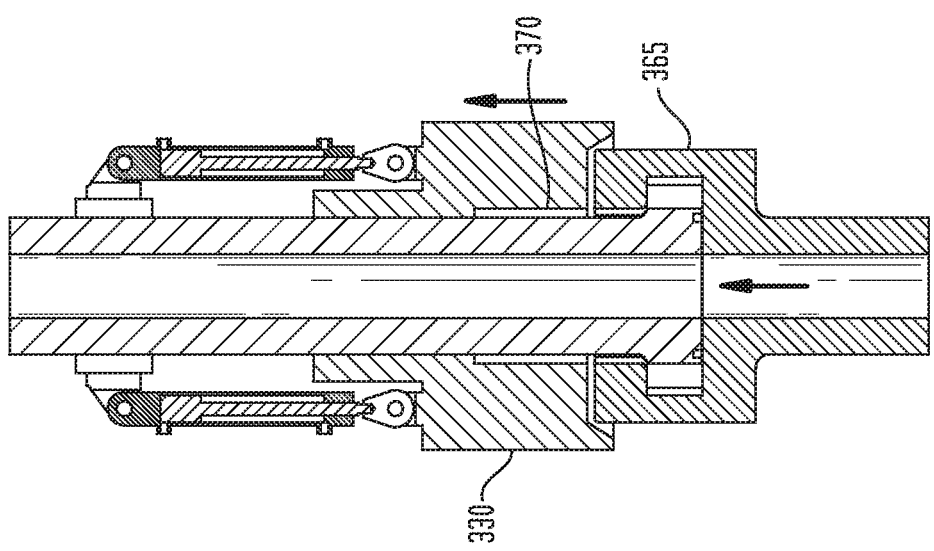
Figure 8A:
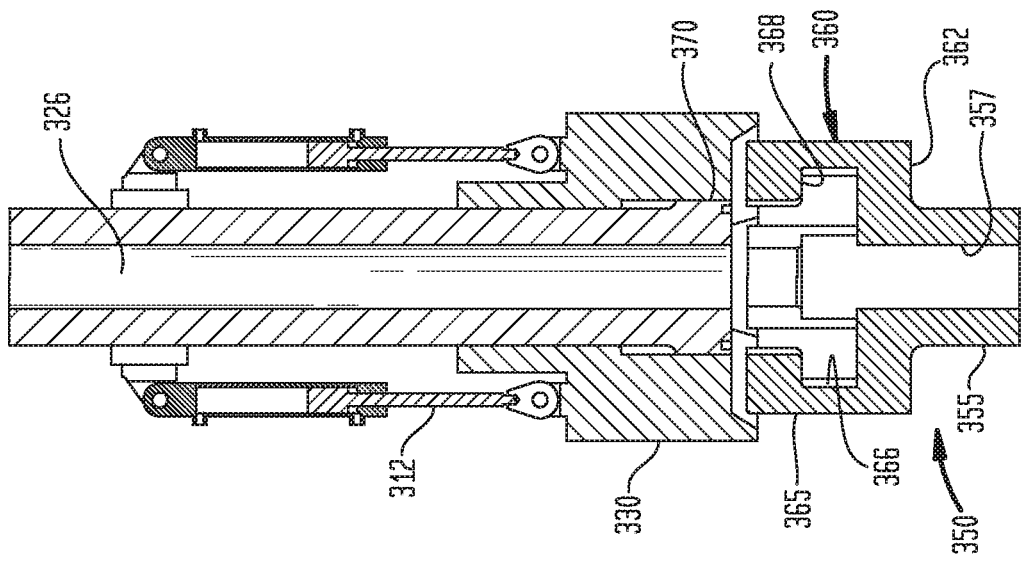
FIG. 8A illustrates a cross-sectional view of the tool coupler of FIG. 7A.

Thereafter, the locking keys 325 are rotated relative to the tool adapter 350, as shown in FIGS. 7C and 8C. In FIGS. 7C and 8C, the locking keys 325 have been rotated beneath the shoulder 368 of the locking receivers 365. In this respect, the tool adapter 350 is axially locked relative to the tool receiver 310. In FIG. 8C, it can be seen that, after rotation, the locking receivers 365 are positioned in the gaps between adjacent locking latches 370. In one example, the locking keys 325 are rotated 90 degrees.

In one embodiment, the tool coupler 300 includes a rotation stop mechanism. In the example shown in FIG. 10A, the base 362 may include a guide such as a bolt 385 that is mateable with a curved slot 381 in the lower end of the tubular body 320. The bolt 385 engages the slot 381 when the locking keys 325 are inserted into the head 362. The bolt 385 moves in the slot 381 during rotation of the locking keys 325. The bolt 385 will hit the end of the slot 381 when the locking keys 325 are under and aligned with the locking receivers 365.

Figure 10C:
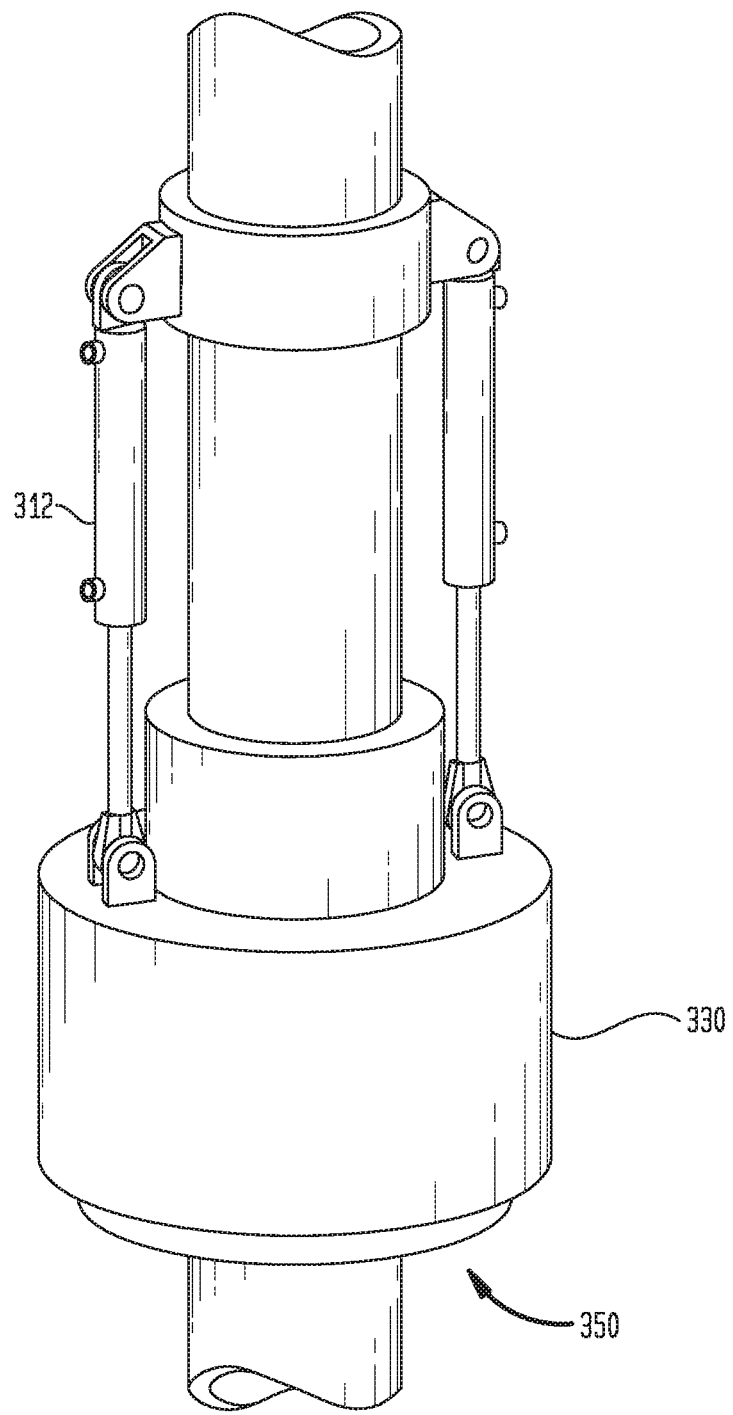
FIG. 10C is a perspective view of the tool adapter engaged to the receiver assembly of the tool coupler of FIG. 7A.

After rotation, the outer housing 330 is lowered relative to the locking receivers 365, as shown in FIG. 10B. The outer housing 330 is lowered using the actuator 312. After the outer housing has been lower 330, the tool adapter 350 is rotationally locked relative to the receiver assembly 310. In this view, the cross-section of the locking latches 370 can be seen due to their position in the gaps between the locking receivers 365. Similarly, the locking receivers 365 are hidden due to their location in the gaps between the locking latches 370. It can also be seen that the bottom of the locking latches 370 are adjacent the base 362 of the tool adapter 350. FIG. 10C is a perspective view of the tool adapter 350 engaged to the receiver assembly 310.

FIGS. 11A-11C are different cross-sectional views of the tool coupler 300 after lowering the outer housing 330. FIG. 11C is a cross-sectional view of the tool coupler 300 cutting across a horizontal plane. FIG. 11A is a cross-sectional view of the tool coupler 300 along line A shown in FIG. 11C. FIG. 11B is a cross-sectional view of the tool coupler 300 along line B shown in FIG. 11C. As seen FIG. 11A, the locking receivers 365 are positioned in the gaps between locking latches 370, and the keys 325 are positioned under the locking receivers 365. As seen in FIG. 11B, the locking latches 370 are disposed between the gaps of the locking receivers 365.

Figure 13:
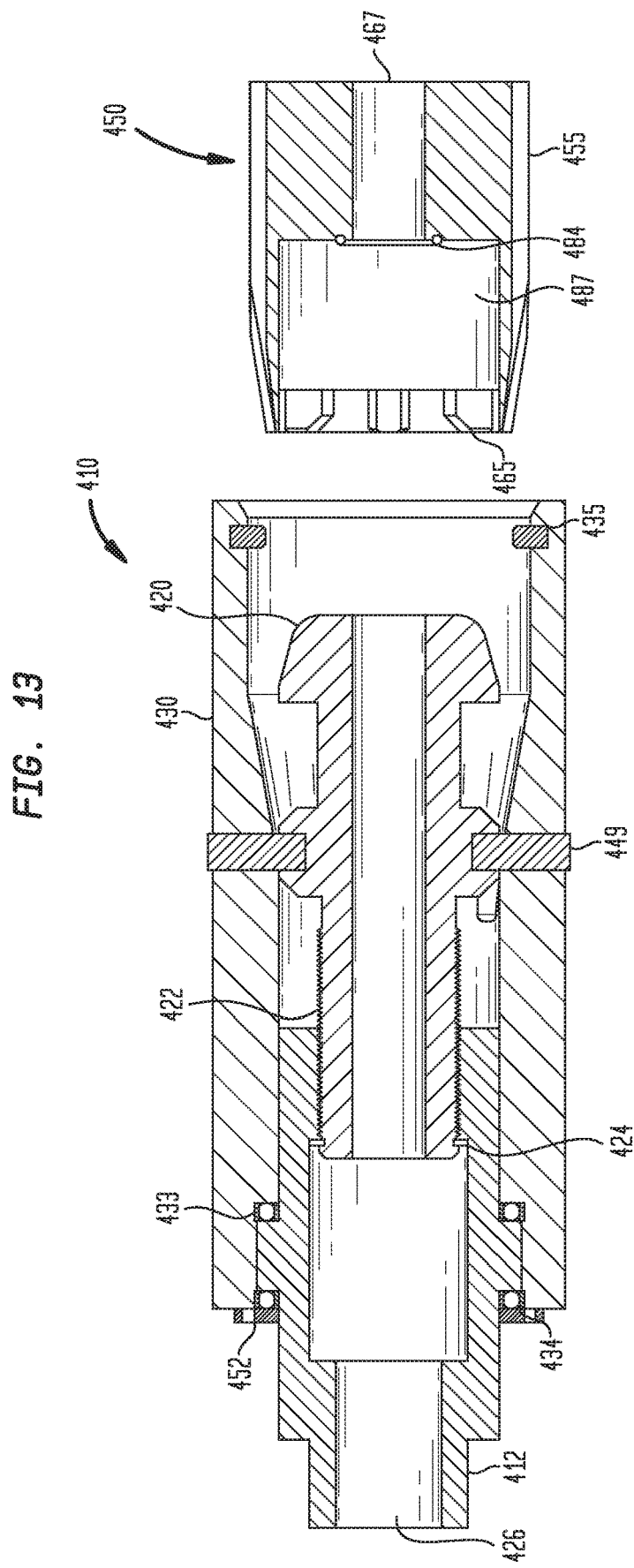
FIG. 13 illustrates an exemplary tool coupler for use with a top drive system according to embodiments of the present disclosure.

FIG. 13 illustrates a tool coupler 400 for use with a top drive system (e.g., top drive 4 in FIG. 1) according to one embodiment. The tool coupler 400 is used to facilitate the connection of a tool 11 to the top drive 4. In some embodiments, the tool coupler 400 is a multi-coupler for supporting load, transferring torque, and having couplings to transfer power, including hydraulic, electric, data, and/or pneumatic. In one embodiment, the tool coupler 400 includes a receiver assembly 410 and a tool adapter 450. The receiver assembly 410 is coupled to the top drive 4, and the tool adapter 450 is coupled to the tool. The tool adapter 450 is engageable with the receiver assembly 410 to connect the tool to the top drive 4.

The receiver assembly 410 generally includes a coupling body 420, an outer housing 430, and an actuator 412 for moving the coupling body 420 rotationally and axially relative to the outer housing 430. An optional swivel connector may be provided to transfer hydraulics, pneumatics, and/or electronics from the top drive 4 to the tool and from the tool to the top drive 4.

Figure 14A:
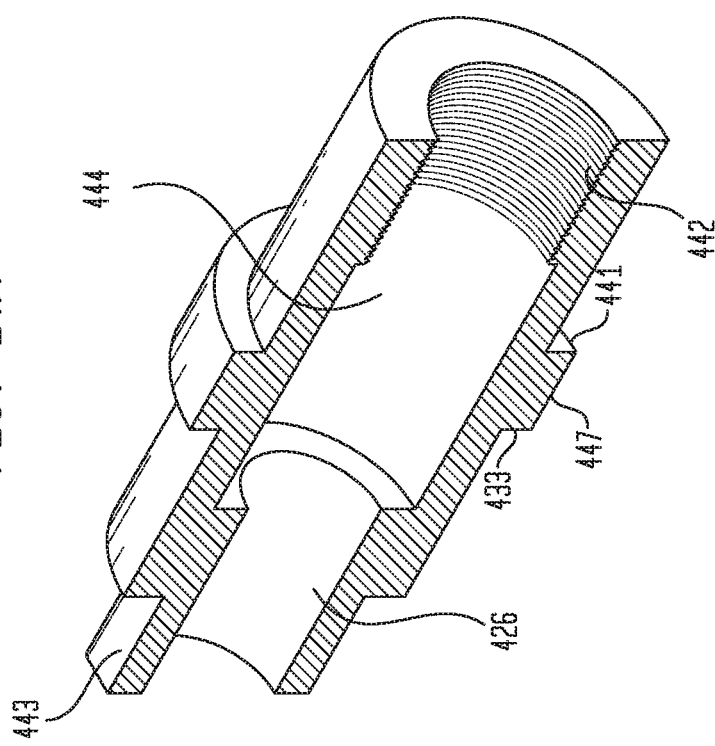
FIG. 14A is a cross-sectional view of the actuator body of FIG. 14.
Figure 14:
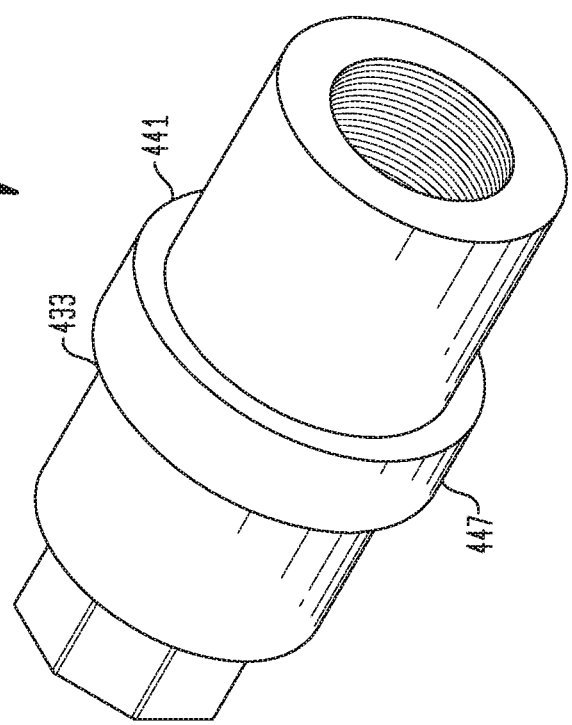
FIG. 14 is a perspective view of the actuator body of the tool coupler of FIG. 13.

FIG. 14 is a perspective view of the actuator body 412, and FIG. 14A is a cross-sectional view of the actuator body 412. Referring to FIG. 14, the actuator body 412 has a tubular shape and includes a bore 426 extending therethrough. The actuator body 412 may be integrated with or attached to a shaft 20 extending from the top drive 4. The upper end of the actuator body 412 may be attached to the shaft 20 via a threaded connection. In one embodiment, the upper end of the actuator body 412 has a hexagon outer shape 443 for engaging the drive mechanism of the top drive system. An enlarged diameter portion 447 on the outer surface of the actuator body 412 includes upper and lower bearing surfaces 441 for coupling with the outer housing 430. Threads 442 are formed on the lower end of the bore 426 for coupling with the coupling body 420. The bore 426 has an enlarged inner diameter section 444 for accommodating the seal 424 on the coupling body 420.

Figure 15:
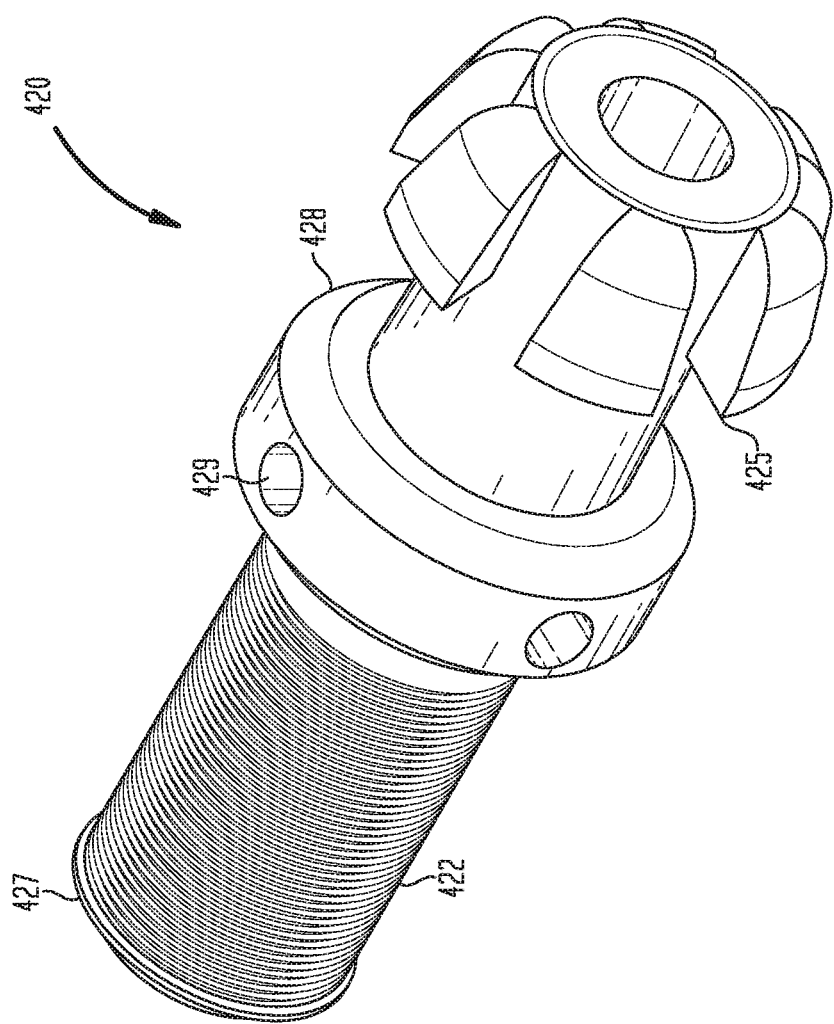
FIG. 15 is a perspective view of the coupling body of the tool coupler of FIG. 13.

FIG. 15 is a perspective view of the coupling body 420. The coupling body 420 has a tubular shape and includes a bore extending therethrough. The bore can communicate with the bore 426 of the actuator body 412. The upper end of the coupling body 420 includes threads 422 for mating with the threads 442 of the actuator body 412. The upper end may also include a sealing groove 427 for retaining a sealing element 424 such as an o-ring. The sealing element 424 may sealingly engage the inner surface of the enlarged inner diameter section 444 of the bore 426. An enlarged diameter portion 428 on the outer surface of the coupling body 420 helps center the coupling body 420 inside the outer housing 430. One or more holes 429 are formed on the outer surface of the enlarged diameter portion 428 for receiving a retainer 449. In one embodiment, the retainer 449 is a pin. In one embodiment, the retainer 449 is shearable.

A plurality of locking members 425 is disposed on the front end of the coupling body 420. In one embodiment, the plurality of locking members 425 is disposed circumferentially around the coupling body 420. The locking members 425 are spaced apart on the outer surface and protrude outwardly in a radial direction. In one embodiment, the locking members 425 are locking keys having a clamping surface. In this example, six locking keys 425 are disposed around the coupling body 420. The locking keys 425 may have an arcuate outer shape, but can have any suitable shape for mating with the tool adapter 450, such as rectangular shape or other suitable polygonal shape. While six locking members 425 are shown, it is contemplated that two, three, four, five, seven, eight, or more locking members 425 may be used. In one example, the outer surface of the locking keys 425 may be tapered in the axial direction to facilitate engagement with the tool adapter 450.

FIG. 16 is a perspective view of the outer housing 430, and FIG. 16A is a cross-sectional view of the outer housing 430. Referring to FIG. 16, the outer housing 430 has a tubular shape and includes a bore 432 extending therethrough. The bore 432 is configured to at least partially house the coupling body 420 and the actuator body 412. The upper end of the bore 432 includes an enlarged inner diameter section 456 to accommodate the enlarged diameter portion 447 on the outer surface of the actuator body 412. The shoulder 454 formed between the lower end of the enlarged diameter section 456 and the unenlarged diameter of the bore 432 serves as a bearing surface. A first bearing 433 is disposed between the lower bearing surface 441 of the actuator body 412 and the shoulder 454 at the end of the enlarged diameter section 456 of the bore 432 of the outer housing 430. See also FIG. 13. A second bearing 434 is disposed between the upper bearing surface 442 of the actuator body 412 and a cover 452 attached to the end of the outer housing 430.

Figure 17:
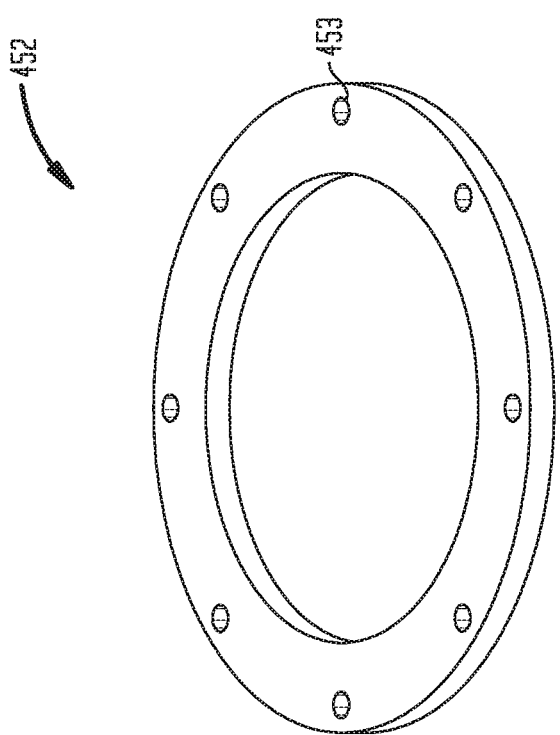
FIG. 17 is a perspective view of the cover of the tool coupler of FIG. 13.

An exemplary cover 452 is illustrated in FIG. 17. In this example, the cover 452 is an annular ring having an inner diameter that is about the same size as the outer diameter of the actuator body 412 but smaller than the outer diameter of the enlarged diameter portion of the actuator body 412. The cover 452 also includes holes 453 for a connector such as a screw or bolt to attach to the outer housing 430.

The lower portion 457 of the bore 432 of the outer housing 430 is enlarged to accommodate the tool adapter 450 and the coupling body 420. One or more alignment features such as alignment pins 435 are attached to the inner surface of the lower portion 457 of the bore 432 adjacent the opening. The alignment pins 435 may be attached to holes 436 formed in the inner surface. In one example, four pins 435 are used; however, it is contemplated that any suitable number of pins may be used, such as one, two, three, five, six, seven, eight, or more pins. In one embodiment, the opening may have a tapered surface 458 to help guide the tool adapter 450 into the outer housing 430.

The outer housing 430 includes a slot 439 for receiving the retainer 449 of the coupling body 420. In one embodiment, the slot 439 includes a first section that allows the retainer 449 to rotate relative to the outer housing 430 and a second section that allows the retainer 449 to move axially relative to the outer housing 430. In one example, the slot 439 is a J-slot. In another embodiment, the slot may be angled so that axial and rotational movements occur simultaneously. In yet another embodiment, the slot includes a rotational section, an axial section, and a transitional section where both axial and rotational movements occur. In one embodiment, the slot 439 is formed through the wall of the outer housing 430, so the position of the retainer 449 in the slot 439 can be viewed from outside the tool coupler 400. In another embodiment, the slot may be formed as a groove in the outer housing 430 if visual indication of the retainer 449 is not necessary. In one example, four slots 439 are used; however, it is contemplated that any suitable number of slots may be used, such as one, two, three, five, six, seven, eight, or more slots.

Figure 18:
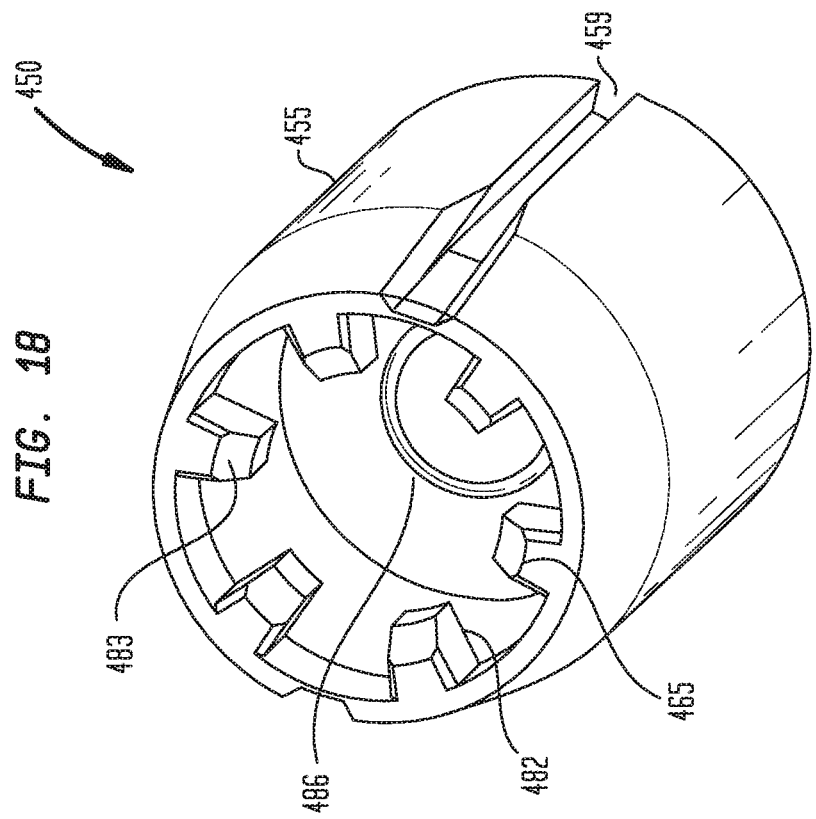
FIG. 18 is a perspective view of the tool adapter of the tool coupler of FIG. 13.

FIG. 18 is a perspective view of the tool adapter 450. FIG. 13 shows a cross-sectional view of the tool adapter 450. As shown in these Figures, the tool adapter 450 includes a tubular body 455 having a central bore 467 therethrough. The lower end of the tubular body 455 may be connected to the tool via a threaded connection or may be integrated with the tool. The upper end of the tool adapter 450 is configured to engage with the receiver assembly 410. The outer diameter of the tool adapter 450 is sized for insertion into the lower opening of the outer housing 430. A plurality of alignment grooves 459 is formed in the outer surface of the tool adapter 450 and extend axially along the tool adapter 450. The alignment grooves 459 are configured to mate with the alignment pins 435 in the outer housing 430. Mating of the mating pins 435 with the grooves 459 aligns the tool adapter 450 for engagement with the coupling body 420. Mating of the mating pins 435 with the grooves 459 also prevent relative rotation between the tool adapter 450 and the outer housing 430. In one example, at least a portion of the wall of the grooves 459 at the upper end is tapered to facilitate receiving of the alignment pins 435. In another example, the outer surface at the upper end of the tool adapter 450 is tapered to facilitate entry into the outer housing 430. The bore of the 457 of the outer housing 430 may have a complementary taper to accommodate the tool adapter 450.

The upper end of the tool adapter 450 has an enlarged bore 487 to receive the coupling body 420. A plurality of locking members is disposed in the enlarged bore 487 for engaging the locking keys 425 of the coupling body 420. In one embodiment, the locking members are locking receivers 465. The locking receivers 465 are spaced apart circumferentially around the inner diameter of the enlarged bore and extend inwardly. The width of the locking receivers 465 are sized so they can fit between the gaps of adjacent locking keys 425 of the coupling body 420. Similarly, the gap between locking receivers 465 are sufficiently sized accommodate the locking keys 425 of the coupling body 420 the receiver assembly 410. The bottom end of the locking receivers 465 forms a clamping surface 482 for engaging the clamping surface at the upper end of the locking keys 425.

The upper end of the locking receivers 465 may include a taper surface 483 to facilitate engagement with the coupling body 420. The axial distance from the bottom end of the locking receivers 465 to the bottom end of the enlarged bore 487 is sufficient to house the locking keys 425. A sealing groove 486 is formed at the interface between the enlarged bore 487 and the central bore 467. A sealing element 484 such as an o-ring may be disposed in the sealing groove 427. The sealing element 484 may sealingly engage the end surface of the coupling body 420.

In operation, the tool coupler 400 is used to connect a tool to a top drive 4. Exemplary tools include tubular gripping tools configured to grip an inner surface or an outer surface of the tubular, fill up tool, compensation tool, cementing tool, and elevators. The tool adapter 450 is integrated with or connected to the tool. The receiver assembly 410 is coupled to or integrated with the shaft of the top drive 4. Referring to FIG. 13, the tool receiver 410 is ready to receive the tool adapter 450. The shear pins 449 of the coupling body 420 are located at one end of the slot 439 of the outer housing 430, as shown in FIG. 19A.

Before inserting the tool adapter 450, the alignment pins 435 of the tool receiver 410 are aligned with the alignment groove 459 of the tool adapter 410. In this position, the locking receivers 465 are also aligned with the gaps between the locking keys 425 of the coupling body 420.

Figure 19:
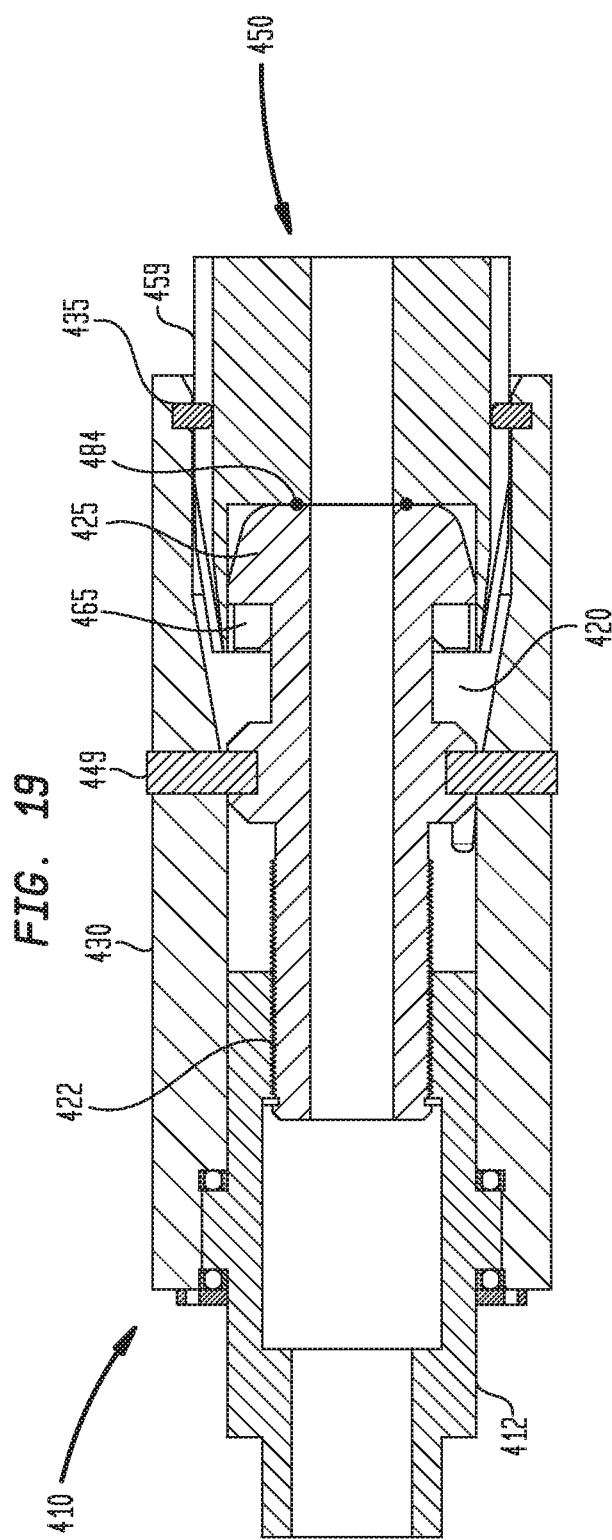
FIG. 19 is a cross-sectional view of the tool adapter partially connected with the receiver assembly of the tool coupler of FIG. 13.
Figure 19A:
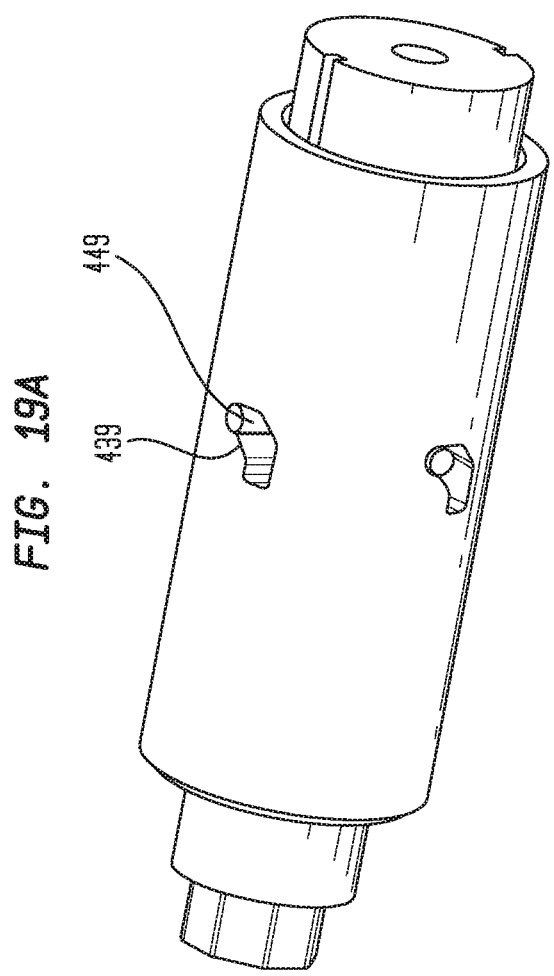
FIG. 19A is a perspective view of FIG. 19.

In FIG. 19, the tool adapter 450 is partially inserted into the outer housing 430 of the receiver assembly 410. As shown, the alignment pins 435 are disposed in the alignment groove 459 of the tool adapter 450. The locking receivers 465 are inserted past the locking keys 425 of the coupling body 420. The front end of the coupling body 420 sealingly contacts the sealing member 484 in the tool adapter 450.

The actuator body 412 is rotated to rotate the coupling body 420 relative to the tool adapter 450. Torque is transferred from the actuator body 412 to the coupling body 420 via threads 422. Because the tool adapter 450 is coupled to the alignment pins 435, the tool adapter 450 cannot rotate. As a result, rotation of the actuator body 412 causes relative rotation between the coupling body 420 and the tool adapter 450. In turn, the locking keys 425 are rotated relative to the locking receivers 465. After rotation, the upper end of the locking keys 425 abuts the lower end of the locking receivers 465, thereby preventing the tool adapter 450 from moving axially relative to the coupling body 420. Rotation of the coupling body 420 also causes the shear pins 449 to move in the slots 439 from the rotational section toward the axial section.

Figure 20:
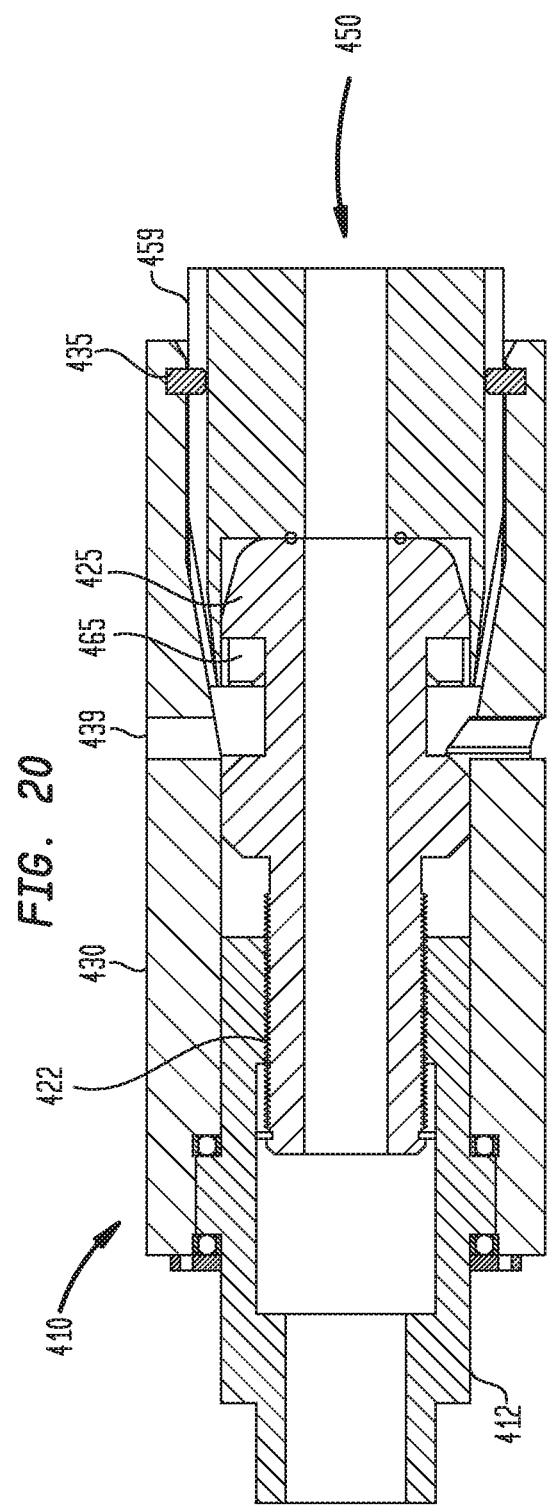
FIG. 20 is a cross-sectional view of the tool adapter fully connected with the receiver assembly of the tool coupler of FIG. 13.
Figure 20A:
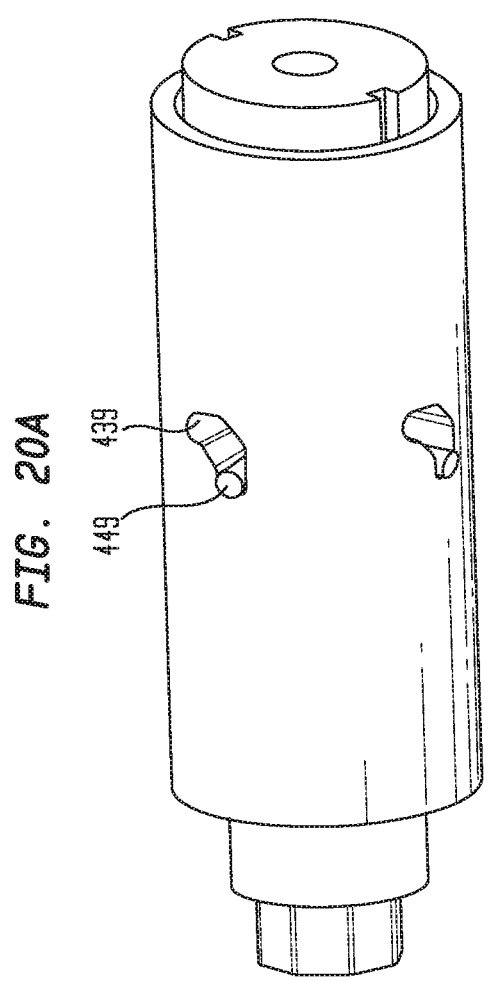
FIG. 20A is a perspective view of FIG. 20.

As the actuator body 412 continues to rotate, the shear pins 449 will reach the axial section of the slots 439. In this position, the coupling body 420 is prevented from relative rotation with outer housing 430. In turn, the actuator body 412 will rotate relative to the coupling body 412. As a result, rotation of the actuator body 412 relative to the coupling body 420 via the threads 422 will cause the coupling body 420 to move axially upward relative to the actuator body 412 and the outer housing 430. The tool adapter 450 is also moved axially in response to the axial movement of the coupling body 420. In one embodiment, the coupling body 420 will continue to move axially until the shear pins reaches the end of the slot 439, as shown in FIG. 20A. FIG. 20 is a cross-sectional view of the tool coupling 400 after the tool adapter 450 is engaged with the receiver assembly 410.

In the event disconnection is necessary, the coupling body 420 may be rotated relative to the outer housing 430 to shear the shear pin 449. For example, a torque sufficient to break the shear pins 449 can be applied to the actuator body 412 and transferred to the coupling body 420. After the shear pins 449 are sheared, the coupling body 420 can be rotated relative to the tool adapter 450 to move the locking keys 425 to the gaps between the locking receivers 465, thereby allowing the tool adapter 450 to be removed from the receiver assembly 410.

FIG. 21 illustrates a tool coupler 500 for use with a top drive system (e.g., top drive 4 in FIG. 1) according to one embodiment. The tool coupler 500 is used to facilitate the connection of a tool 11 to the top drive 4. In some embodiments, the tool coupler 500 is a multi-coupler for supporting load, transferring torque, and having couplings to transfer power, including hydraulic, electric, data, and/or pneumatic. In one embodiment, the tool coupler 500 includes a receiver assembly 510 and a tool adapter 550. The receiver assembly 510 is coupled to the top drive 4, and the tool adapter 550 is coupled to the tool. The tool adapter 550 is engageable with the receiver assembly 510 to connect the tool to the top drive 4.

The receiver assembly 510 generally includes a coupling body 520 and locking members 525. An optional swivel connector may be provided to transfer hydraulics, pneumatics, and/or electronics from the top drive 4 to the tool and from the tool to the top drive 4.

FIG. 22 is a cross-sectional view of the coupling body 520. The coupling body 520 has a tubular shape and includes a bore 526 extending therethrough. The bore 526 at the opening of the coupling body 520 has an enlarged inner diameter section 521 to receive the tool adapter 550. In one embodiment, an intermediate diameter section 522 between the bore 526 and the enlarged diameter section 521 forms a shoulder for engaging the tool adapter 550. One or more sealing elements 524 may be used to sealingly engage the tool adapter 550. A suitable sealing element 524 is an o-ring. A first sealing element 524 may be positioned to engage the front end of the tool adapter 550. Alternatively, or in addition to the first sealing element 524, a second sealing element 524 may be positioned in the coupling body 520 to engage the side of the tool adapter 550.

Referring also to FIGS. 22A and 22B, a plurality of locking members 525 is disposed in the receiver assembly 510 to engage the tool adapter 550. In one embodiment, the plurality of locking members 525 is disposed circumferentially around the enlarged diameter section 521 of the coupling body 520. The locking members 525 protrude inwardly in a radial direction into the enlarged diameter section 521 to engage a groove 565 of the tool adapter 550. The locking members 525 are positioned in a hole 565 formed in the coupling body 520 and may be inserted into the hole 565 from the exterior. The locking members 525 are biased into the enlarged diameter section 521 using a biasing member 566 such as a spring. In one example, the locking members 525 are locking screws. In this example, two locking screws 525 are disposed around the coupling body 520. While two locking members 525 are shown, it is contemplated that three, four, five, six, seven, eight, or more locking members 525 may be used. In one example, the inner end of the locking members 525 is tapered to facilitate engagement with the tool adapter 550. In another example, the outer end of the locking members 525 is color coded to indicate the status of the locking members 525. For example, the locking member 525 is sufficiently long such that it extends out of the coupling body 520 when it is engaged with the tool adapter 550. The portion 567 extending out of the coupling body 520 may have a green color to indicate the locking member 525 is engaged with the tool adapter 550. FIG. 22A shows the locking member 525 in a locked position and the green portion 567 is visible. The portion of the locking member 525 below the green colored portion 567 may have a different color such as yellow or red. In this respect, when the locking member 525 is retracted from engagement with the tool adapter 550, the different colored portion would extend out of the coupling body 520 and visible to the operator to indicate the locking member 525 is not locked to the tool adapter 550. FIG. 22B shows the locking member 525 in an unlocked position and the yellow portion below the green portion 567 is also visible.

Referring to FIG. 22, the coupling body 520 includes one or more alignment features for alignment with the tool adapter 550. In one embodiment, alignment holes 536 are formed in the coupling body 520 for receiving alignment pins of the tool adapter 550. The alignment holes 536 are located at bottom end of the coupling body 520 facing the tool adapter 550. In another embodiment, the alignment profiles 538 are formed in the bore 526 of the coupling body 520 for receiving raised profiles on the tool adapter 550. For example, the alignment profiles 538 are recessed profiles formed in the wall of the bore 526 and are complementary to the raised profiles of the tool adapter 550. It is contemplated the coupling body 520 may have one or more alignment features such as the alignment holes 536, the alignment profiles 538, or both.

Figure 23:
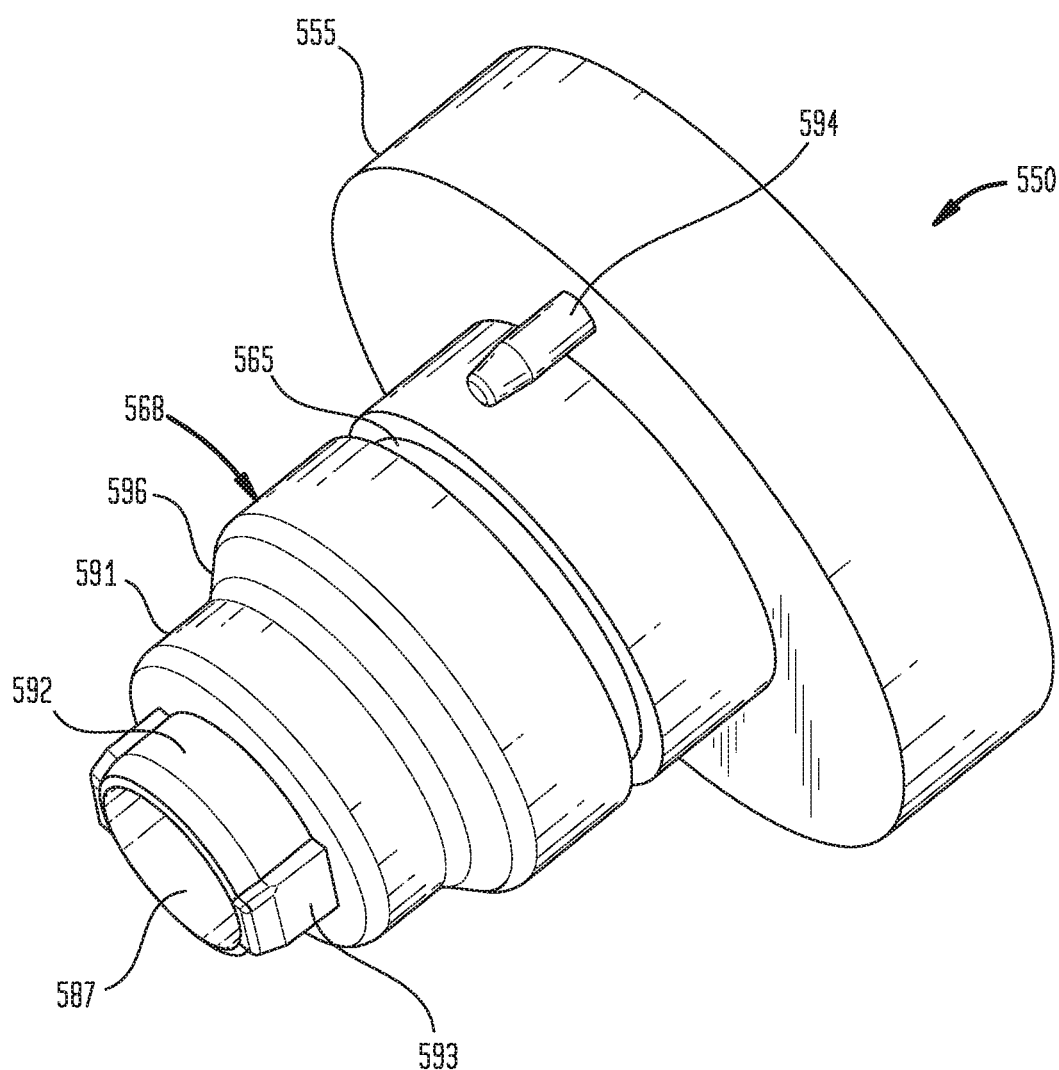
FIG. 23 is a perspective view of the tool adapter of the tool coupler of FIG. 21.

FIG. 23 is a perspective view of the tool adapter 550. The tool adapter 550 includes a tubular body 555 having a central bore 587 therethrough. The lower end of the tubular body 555 may be connected to the tool via a threaded connection or may be integrated with the tool. The upper end of the tool adapter 550 is configured to engage the receiver assembly 510. In one embodiment, the tubular body 555 includes a head portion 568 sized for insertion into the enlarged diameter section 521 of the coupling body 520. The head portion 568 includes an intermediate portion 591 and an upper portion 592. The upper portion 592 is sized to fit within the bore 526, the intermediation portion 591 is sized to fit within the intermediate diameter section 522, and the upper portion 592 is sized to fit within the enlarged diameter section 521 of the coupling body 520. In this respect, the outer diameter of the upper portion 592 is smaller than the intermediate portion 591, which is smaller than the head portion 568. An incline surface 596 may be used as a transition between the intermediate portion 591 and the head portion 568. The front end of the intermediate portion 591 may engage the first sealing element 524, the side of the intermediate portion 591 may engage the second sealing element 524.

A groove 565 is formed on an outer surface of the head portion 568. In one embodiment, the groove 565 is a circumferential groove. The groove 565 is configured to receive the locking members 525 of the receiver assembly 510. When the locking members are inserted into the groove 565, the tool adapter 550 is axially locked to the receiver assembly 510. In this respect, load may be transferred between the tool adapter 550 and the receiver assembly 510. As a result, the top drive may raise or lower the tool via the connection between the tool adapter 550 and the receiver assembly 510. In another embodiment, instead of a groove, complementary locking holes may be formed in the head portion 568 to receive the locking members 525.

Figure 25:
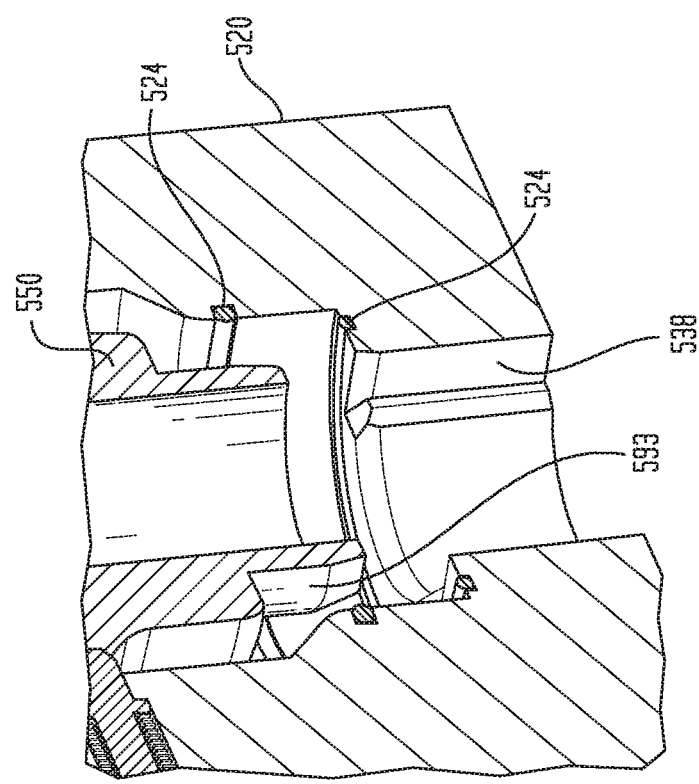
FIG. 25 is a cross-sectional view of another embodiment of an alignment feature of the tool coupler of FIG. 21.
Figure 24:
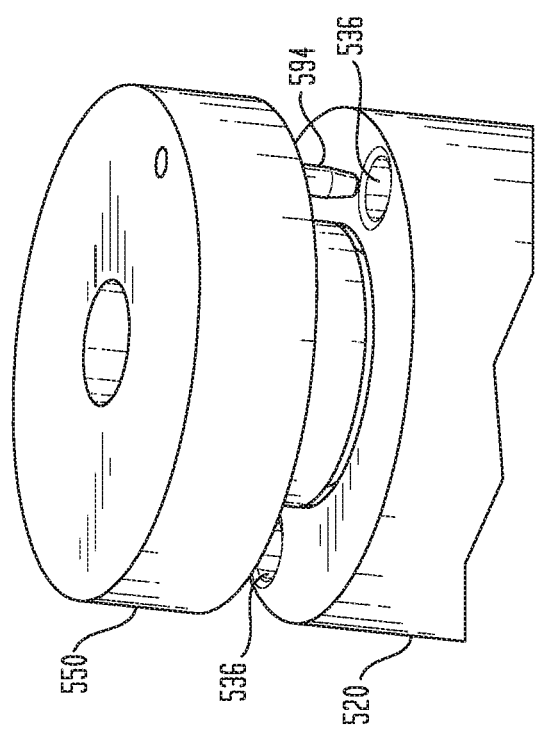
FIG. 24 is a perspective view of an embodiment of an alignment feature of the tool coupler of FIG. 21.

The tool adapter 550 includes one or more complementary alignment features for alignment with the receiver assembly 510. In the embodiment shown in FIG. 24, the tool adapter 550 includes one or more alignment pins 594 insertable into the alignment holes 536 of the coupling body 520. In the embodiment shown in FIG. 25, the upper portion 592 includes a plurality of raised profiles 593. The raised profiles 593 are configured to engage the alignment profiles 538 of the coupling body 520. When the complementary alignment features of the tool adapter 550 are engaged with the alignment features of the receiver assembly 510, the alignment features rotationally lock the tool adapter 550 to the receiver assembly 510. As a result, torque may be transferred between the tool adapter 550 and the receiver assembly 510. Thus, when the alignment pins 594 are engaged with the alignment holes 536 and/or the raised profiles 593 are engaged with the recess profiles 538, torque may be transferred between the tool adapter 550 and the receiver assembly 510.

In operation, the tool coupler 500 is used to connect a tool to a top drive 4. Exemplary tools include tubular gripping tools configured to grip an inner surface or an outer surface of the tubular, fill up tool, compensation tool, cementing tool, and elevators. The tool adapter 550 is integrated with or connected to the tool. The receiver assembly 510 is coupled to or integrated with the shaft of the top drive 4. Referring to FIG. 21, the tool receiver 510 is ready to receive the tool adapter 550. As shown, the tool adapter 550 is partially inserted into the receiver assembly 510.

Figure 26:
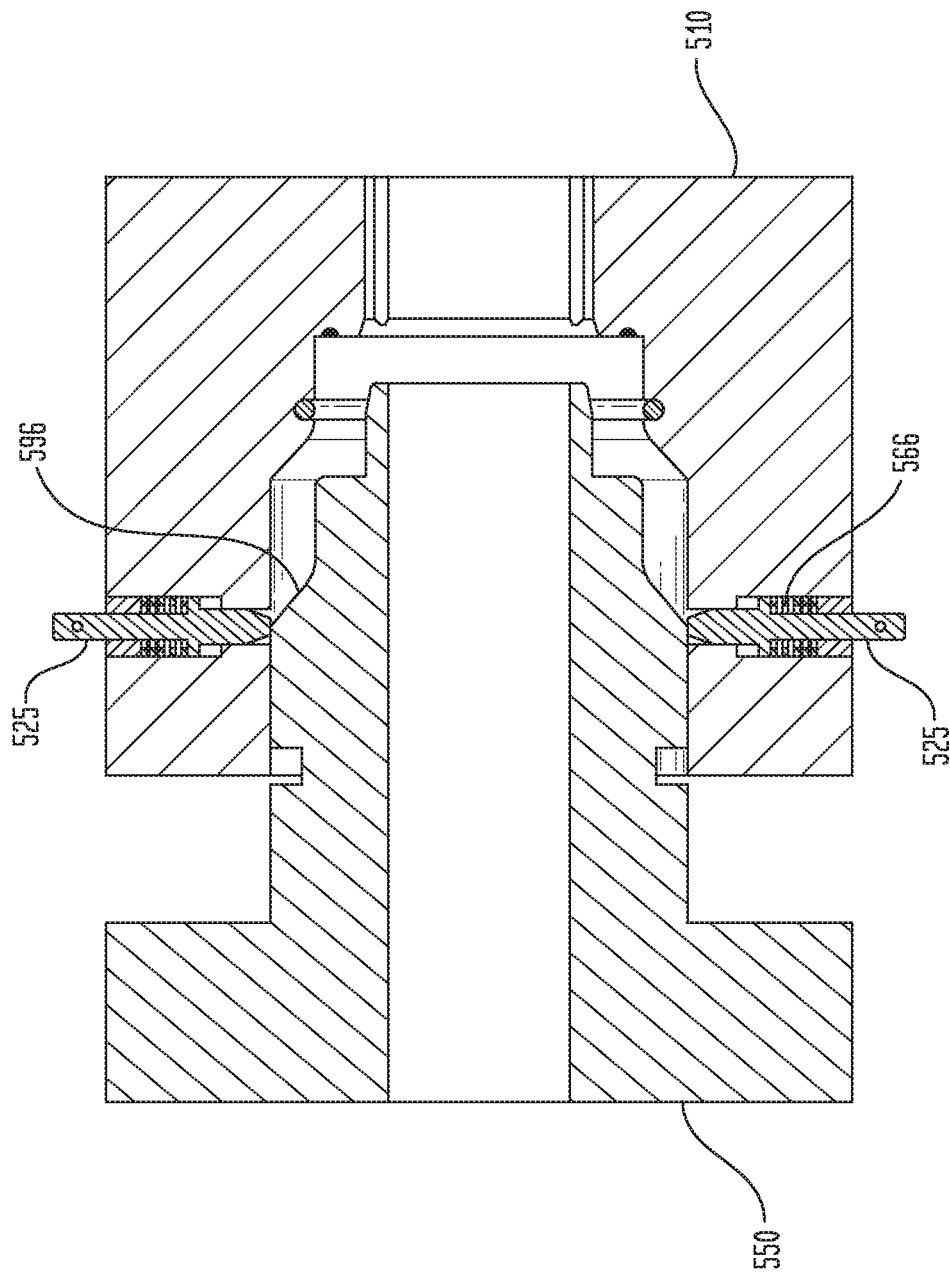
FIG. 26 is a cross-sectional view of the tool adapter partially connected with the receiver assembly of the tool coupler of FIG. 21.

Referring to FIG. 26, during insertion, locking screws 525 may contact the incline surface 596 of the tool adapter 550. The incline surface 596 will force the locking screws 525 to move radially outward against the spring 566. In the retracted position, the yellow colored portion of the locking screws 525 can be seen by the operator.

As the tool adapter 550 continues to be inserted, the alignment features will engage. For example, the raised profiles 593 are aligned for engagement with the recessed profiles 538. While not shown in FIG. 26, the alignment pins 594 may align with the alignment holes 536 of the receiver assembly 510.

Figure 27:
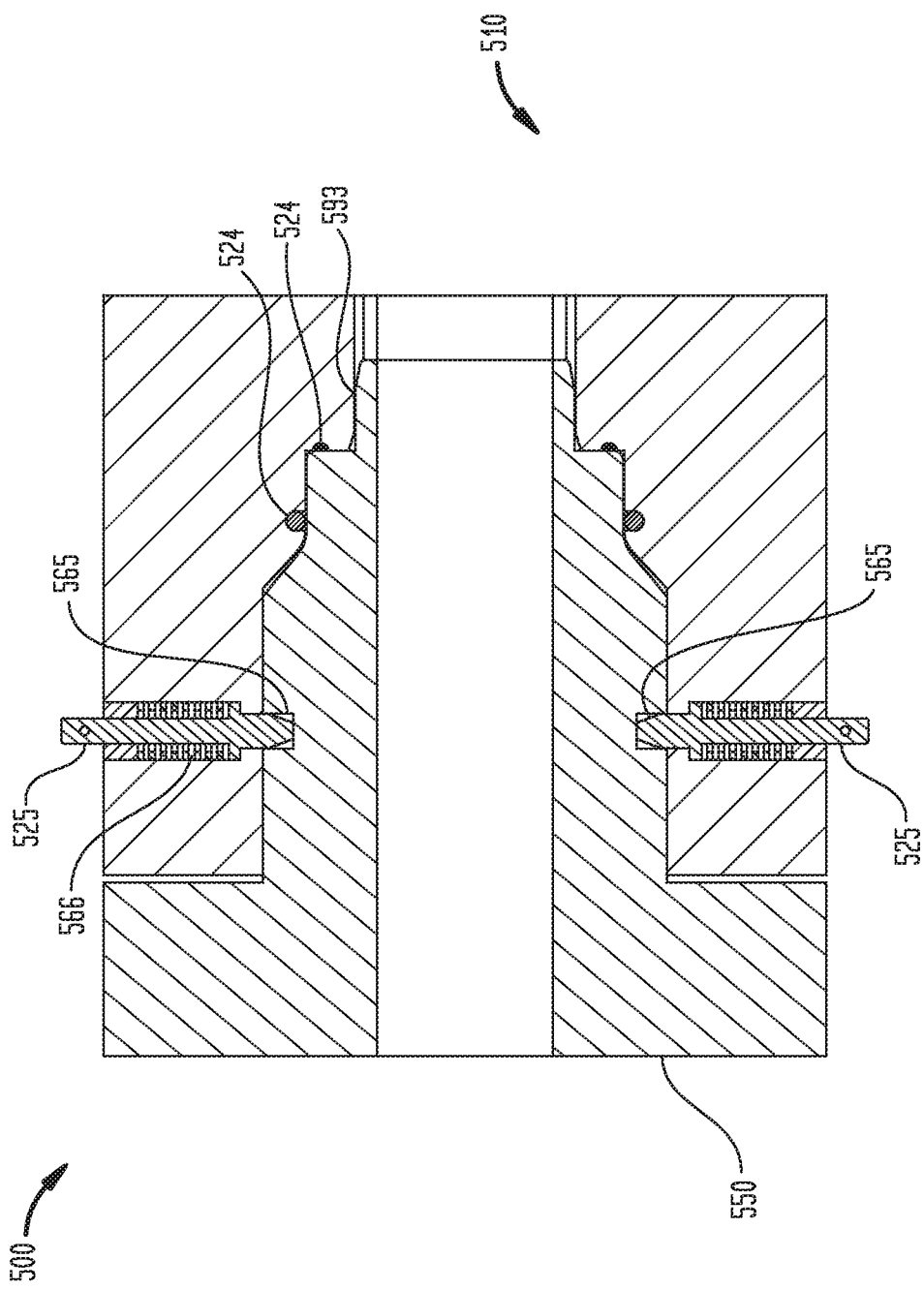
FIG. 27 is a cross-sectional view of the tool adapter fully connected with the receiver assembly of the tool coupler of FIG. 21.

FIG. 27 shows the tool adapter 550 connected to the receiver assembly 510. The locking screws 525 have been biased into the groove 565 by the spring 566. In this position, only the green colored portion of the locking screws 525 extend out of the coupling body 520. The tool adapter 550 is now axially movable with the receiver assembly 510. Also, the raised profiles 593 have mated with the recessed profiles 538 of the receiver assembly 510. Torque can now be transferred from the receiver assembly 510 to the tool adapter 550. It can be seen the sealing members 524 have sealingly engaged the tool adapter 550.

In one or more of the embodiments described herein, one or more couplings may be provided between the tool adapter and the receiver assembly. The couplings are configured to transfer data and/or power, including hydraulic, electric, pneumatic, and combinations thereof. In one example, the coupling is a tube extending upward from the tool adapter (e.g., 150, 350, 450, 550), and the bore in the tube is configured to communicate power and/or data. The coupling is insertable into a channel in the receiver assembly (e.g., 110, 310, 410, 510). In this manner, data and/or power, including hydraulic, electric, pneumatic, and combinations thereof can be transferred between the tool adapter and the receiver assembly. For example, in FIG. 24, the alignment pin 594 may be a coupling that communicates with the tool, and the hole 536 may be a channel that communicates with the top drive or a swivel. When connected, data and/or power may be communicated between the top drive and the tool. It must be noted that while not shown, tool adapter may include one or more dedicated alignment pins 594 and one or more dedicated couplings engageable with the receiver assembly. In another example, in FIG. 10A, the guide 385 may also act as a coupling that communicates with the tool, and the slot 381 may be a channel that communicates with the top drive or a swivel. When connected, data and/or power may be communicated between the top drive and the tool. It must be noted that while not shown, tool adapter may include one or more dedicated guides 385 and one or more dedicated couplings engageable with the receiver assembly.

In one embodiment, a tool coupler includes a first component having a tubular body and a locking member and a second component. The second component includes a housing having an opening for receiving the tubular body; a locking ring having a latch; an axial channel; and a recess for receiving the locking member, wherein the latch is positioned in the channel to retain the locking member in the recess.

In one or more embodiments described herein, the locking member is rotatable into or out of the recess.

In one or more embodiments described herein, the locking ring is dispose around a recessed groove of the housing.

In one or more embodiments described herein, the locking ring is axially movable in the recessed groove between an upper position and a lower position.

In one or more embodiments described herein, the latch is positioned to retain the locking member in the recess when the locking ring is in the lower position.

In one or more embodiments described herein, the locking member is movable out of the recess when the locking ring is in the upper position.

In one or more embodiments described herein, the first component includes a plurality of locking members.

In one or more embodiments described herein, the tool coupler includes an actuator for moving the locking ring.

In one or more embodiments described herein, the actuator comprises a piston and cylinder assembly.

In one or more embodiments described herein, the actuator comprises a biasing member.

In one or more embodiments described herein, the locking member is disposed on an outer surface of the tubular body and protrudes outwardly in a radial direction.

In one embodiment, a method of coupling a first component to a second component includes inserting a locking member of the first component into an axial channel of the second component; rotating the locking member relative to the axial channel to move the locking member into a recess in the second component; and axially moving a locking ring relative to the first component, whereby a latch of the locking ring is moved into position to retain the locking member in the recess.

In one or more embodiments described herein, the latch of the locking ring is movable in the axial channel.

In one or more embodiments described herein, the latch of the locking ring at least partially blocks the recess.

In one or more embodiments described herein, moving the locking member into the recess axially locks the first component to the second component.

In one or more embodiments described herein, the locking ring is movable in a groove between an upper position and a lower position.

In one or more embodiments described herein, the locking ring is moved to the lower position to retain the locking member in the recess.

In one or more embodiments described herein, the method includes using an actuator to move the locking ring.

In one or more embodiments described herein, the actuator includes one of a piston and cylinder assembly and a biasing member.

In one or more embodiments described herein, the method includes placing a coupling of the first component into communication with a channel in the second component.

In one embodiment, a tool coupler includes a first component having a tubular body and a plurality of circumferentially spaced locking receivers; and a second component having a housing having a tubular body and a plurality of locking members, wherein the plurality of locking receivers is rotatable into engagement with the plurality of locking members to axially lock the first component to the second component; and a locking housing disposed around and axially movable relative to the tubular body. The locking housing includes an opening for receiving the plurality of locking receivers; and a plurality of latches disposed in the opening, wherein the plurality of latches is disposable between the plurality of locking receivers to rotationally lock the first component to the second component.

In one or more embodiments described herein, the plurality of locking receivers includes a shoulder and the plurality of locking members is rotatable into engagement with the shoulder.

In one or more embodiments described herein, the first component further comprises a base and the plurality of locking receivers is circumferentially disposed on the base.

In one or more embodiments described herein, the plurality of locking members is disposed between the base and the shoulder.

In one or more embodiments described herein, a gap between the plurality of locking receivers is sufficient to accommodate the plurality of locking members.

In one or more embodiments described herein, the plurality of latches is disposable between the plurality of locking members to rotationally lock the first component to the second component.

In one or more embodiments described herein, the plurality of locking members protrudes outwardly from the tubular body.

In one or more embodiments described herein, the tool coupler includes an actuator for moving the locking housing.

In one or more embodiments described herein, the actuator comprises a piston and cylinder assembly.

In one or more embodiments described herein, the tool coupler includes a rotation stop mechanism to stop relative rotation between the first component and the second component.

In one or more embodiments described herein, the rotation stop mechanism comprises a guide disposed on the first component; and a slot formed in the second component for receiving the guide.

In one embodiment, a method of coupling a first component to a second component includes positioning a plurality of locking receivers of the first component between a plurality of locking members of the second component; rotating the plurality of locking members into engagement with the plurality of locking receivers to axially lock the first component to the second component; and axially moving a locking housing relative to the locking members, whereby a latch of the locking housing is moved into position between the plurality of locking receivers.

In one or more embodiments described herein, the latch of the locking housing is moved into position between the plurality of locking members.

In one or more embodiments described herein, moving the locking housing comprises moving the plurality of locking receivers into an opening in the locking housing.

In one or more embodiments described herein, rotating the plurality of locking members comprises rotating the plurality of locking members into axial abutment with a shoulder of the locking receivers.

In one or more embodiments described herein, rotating the plurality of locking members comprises rotating the plurality of locking members into axial alignment with the locking receivers.

In one or more embodiments described herein, the locking ring is moved to the lower position to retain the locking member in the recess.

In one or more embodiments described herein, the method includes using an actuator to move the locking housing.

In one or more embodiments described herein, the method includes stopping rotation of the plurality of locking members using a guide and slot mechanism.

In one or more embodiments described herein, the method includes placing a coupling of the first component into communication with a channel in the second component.

In one embodiment, a tool coupler includes a first component having a tubular body and a plurality of circumferentially spaced locking receivers disposed in a bore of the tubular body; and a second component. The second component having an outer housing having a tubular body, the outer housing having an alignment member for engaging the first component; a coupling body disposed in the outer housing, the coupling body having a plurality of locking members, wherein the plurality of locking members is rotatable into engagement with the plurality of locking receivers of the first component to axially lock the first component to the second component; and an actuator for moving the coupling body relative to the outer housing.

In one or more embodiments described herein, the tool coupler includes a retainer attached to the coupling body, the retainer movable in a slot formed in the outer housing.

In one or more embodiments described herein, the retainer is shearable.

In one or more embodiments described herein, the slot limit rotational movement of the coupling body relative to the outer housing.

In one or more embodiments described herein, the actuator is rotatable relative to the outer housing and the coupling body.

In one or more embodiments described herein, rotation of the actuator causes axial movement of the coupling body relative to the outer housing.

In one or more embodiments described herein, the tubular body of the first component is insertable into the outer housing.

In one or more embodiments described herein, the plurality of locking members are disposable in the bore of the first component.

In one or more embodiments described herein, an upper end of the plurality of locking members is engageable to a lower end of the plurality of locking receivers.

In one or more embodiments described herein, the alignment member is engageable with a groove formed on an outer surface of the first component to rotationally lock the first component to the second component.

In one or more embodiments described herein, the actuator is connected to the coupling body using a threaded connection.

In one embodiment, a method of coupling a first component to a second component includes engaging an alignment guide of the second component to the first component; positioning a plurality of locking receivers of the first component between a plurality of locking members disposed inside an outer housing of the second component; rotating the plurality of locking members into engagement with the plurality of locking receivers to axially lock the first component to the second component; and axially moving the plurality of locking members and the plurality of locking receivers relative to the outer housing.

In one or more embodiments described herein, the plurality locking members are disposed on a coupling body.

In one or more embodiments described herein, the method includes coupling a retainer of the coupling body to a slot of the outer housing.

In one or more embodiments described herein, rotation of the plurality of locking members is limited by the retainer and slot.

In one or more embodiments described herein, axially moving the plurality locking members moves the retainer axially along the slot.

In one or more embodiments described herein, after the retainer axially along the slot, the coupling body is rotationally locked against the outer housing.

In one or more embodiments described herein, the method includes using an actuator to rotate and axially move the plurality of locking members.

In one or more embodiments described herein, axially moving the plurality of locking members and the plurality of locking receivers relative to the outer housing also move the first component axially relative to the outer housing.

In one or more embodiments described herein, the method includes placing a coupling of the first component into communication with a channel in the second component.

In one embodiment, a tool coupler includes a first component having a tubular body; a locking receiver formed on an outer surface of the tubular body; and an alignment feature. The tool coupler also includes a second component having a coupling body having a bore for receiving the tubular body of the first component; a locking member disposed in the coupling body for engaging the locking receiver; and a complementary alignment feature for engaging the alignment feature of the first component.

In one or more embodiments described herein, the locking member and the locking receiver are configured to transfer load.

In one or more embodiments described herein, the alignment feature and the complementary feature are configured to transfer torque.

In one or more embodiments described herein, the locking receiver comprises a groove.

In one or more embodiments described herein, the locking member is radially movable relative to the coupling body.

In one or more embodiments described herein, the locking member is retractable from the bore of the coupling body.

In one or more embodiments described herein, the tool coupler includes a biasing member for biasing the locking member.

In one or more embodiments described herein, the locking member includes a visible portion extendable out of the coupling body.

In one or more embodiments described herein, the alignment feature comprises one or more alignment pins, and the complementary alignment feature comprises one or more alignment holes.

In one or more embodiments described herein, the alignment feature comprises one or more raised profiles, and complementary alignment feature comprises one or more recessed profiles.

In one or more embodiments described herein, the tubular body of the first component includes an incline surface for moving the locking member.

In one embodiment, a method of coupling a first component to a second component includes engaging an alignment feature of the first component to a complementary alignment feature of the second component; retracting a locking member of the second component while inserting the first component into the second component; and extending the locking member into engagement with a locking receiver of the first component.

In one or more embodiments described herein, the method includes transferring load between the first component and the second component via the locking member and the locking receiver.

In one or more embodiments described herein, the method includes transferring torque between the first component and the second component via the alignment feature and the complementary alignment feature.

In one or more embodiments described herein, the method includes biasing the locking member using a biasing member.

In one or more embodiments described herein, the method includes retracting the locking member comprising contacting the locking member with an incline surface on an outer surface of the tubular body of the first component.

In one or more embodiments described herein, the method includes engaging the alignment feature to a complementary alignment feature comprises engaging a raised profile of the first component to a recessed profile of the second component.

In one or more embodiments described herein, the method includes engaging the alignment feature to a complementary alignment feature comprises engaging an alignment pin of the first component to an alignment hole of the second component.

In one or more embodiments described herein, the method includes extending the locking member into engagement with the locking receiver of the first component comprises extending a plurality of locking members into engagement with a groove of the first component.

In one or more embodiments described herein, the method includes placing a coupling of the first component into communication with a channel in the second component.

While the foregoing is directed to embodiments of the present disclosure, other and further embodiments of the disclosure may be devised without departing from the basic scope thereof, and the scope thereof is determined by the claims that follow.

The invention claimed is:
1. A tool coupler comprising:
    a first component having a tubular body and a locking member; and
    a second component having:
        a housing having an opening for receiving the tubular body;
        a locking ring having a latch;
        an axial channel; and
        a recess for receiving the locking member, wherein the latch is positioned in the channel to retain the locking member in the recess and wherein the axial channel provides the locking member entry into the recess.
2. The tool coupler of claim 1, wherein the locking member is rotatable into or out of the recess.
3. The tool coupler of claim 1, wherein the locking ring is disposed around a recessed groove of the housing.
4. The tool coupler of claim 3, wherein the locking ring is axially movable in the recessed groove between an upper position and a lower position.

5. The tool coupler of claim 4, wherein the latch is positioned to retain the locking member in the recess when the locking ring is in the lower position.

6. The tool coupler of claim 4, wherein the locking member is movable out of the recess when the locking ring is in the upper position.

7. The tool coupler of claim 1, wherein the first component comprises a plurality of locking members.

8. The tool coupler of claim 1, wherein the locking member is disposed on an outer surface of the tubular body and protrudes outwardly in a radial direction.

9. The tool coupler of claim 1, further comprises an actuator for moving the locking ring.

10. The tool coupler of claim 9, wherein the actuator comprises a piston and cylinder assembly.

11. The tool coupler of claim 9, wherein the actuator comprises a biasing member.

12. The tool coupler of claim 1, wherein the latch of the locking ring is at least partially disposed in the axial channel prior to the locking member being positioned in the recess.

13. A method of coupling a first component to a second component comprising:
  inserting a locking member of the first component into an axial channel of the second component;
  rotating the locking member relative to the axial channel to move the locking member into a recess in the second component; and
  axially moving a locking ring into contact with the first component, whereby a latch of the locking ring is moved into position to retain the locking member in the recess.

14. The method of claim 13, wherein the latch of the locking ring is movable in the axial channel.

15. The method of claim 14, wherein the latch of the locking ring is at least partially disposed in the axial channel prior to inserting the locking member of the first component into the axial channel.

16. The method of claim 13, wherein the latch of the locking ring at least partially blocks the recess.

17. The method of claim 13, wherein moving the locking member into the recess axially locks the first component to the second component.

18. The method of claim 13, wherein the locking ring is movable in a groove of the second component between an upper position and a lower position.

19. The method of claim 18, wherein the locking ring is moved to the lower position to retain the locking member in the recess.

20. The method of claim 13, further comprising using an actuator to move the locking ring.

21. The method of claim 20, wherein the actuator includes one of a piston and cylinder assembly and a biasing member.

22. The method of claim 20, further comprising placing a coupling of the first component into communication with a channel in the second component.

\* \* \* \* \*